United States Patent
Kitazato et al.

(10) Patent No.: US 10,728,610 B2
(45) Date of Patent: Jul. 28, 2020

(54) RECEIVING APPARATUS, RECEIVING METHOD, TRANSMISSION APPARATUS, AND TRANSMISSION METHOD

(71) Applicant: SONY CORPORATION, Tokyo (JP)

(72) Inventors: Naohisa Kitazato, Tokyo (JP); Yasuaki Yamagishi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/119,404

(22) PCT Filed: Feb. 13, 2015

(86) PCT No.: PCT/JP2015/053926
§ 371 (c)(1),
(2) Date: Aug. 17, 2016

(87) PCT Pub. No.: WO2015/129480
PCT Pub. Date: Sep. 3, 2015

(65) Prior Publication Data
US 2017/0055024 A1   Feb. 23, 2017

(30) Foreign Application Priority Data

Feb. 26, 2014 (JP) .................... 2014-034957

(51) Int. Cl.
*H04N 21/434* (2011.01)
*H04H 20/93* (2008.01)
(Continued)

(52) U.S. Cl.
CPC ........ *H04N 21/4345* (2013.01); *H04H 20/93* (2013.01); *H04L 65/4076* (2013.01);
(Continued)

(58) Field of Classification Search
CPC ........... H04N 21/4345; H04N 21/8456; H04N 21/8545; H04N 21/8586
See application file for complete search history.

(56) References Cited

U.S. PATENT DOCUMENTS

| 2013/0291040 A1* | 10/2013 | Rhyu ................. H04N 21/4622 725/109 |
| 2014/0189756 A1* | 7/2014 | Beals ................. H04N 21/6193 725/68 |
| 2015/0127845 A1* | 5/2015 | Phillips ................. H04L 65/601 709/231 |

FOREIGN PATENT DOCUMENTS

| EP | 2667595 A2 | 11/2013 |
| JP | 2011-066556 A | 3/2011 |

(Continued)

OTHER PUBLICATIONS

ETSI TS 102 796 V1.2.1 (Nov. 2012).*

(Continued)

*Primary Examiner* — Yassin Alata
(74) *Attorney, Agent, or Firm* — Chip Law Group

(57) ABSTRACT

The present technology relates to a receiving apparatus, a receiving method, a transmission apparatus, and a transmission method that enable various operation modes to be provided by hybrid delivery using broadcasting and communication. A control data acquisition unit acquires control data transmitted via broadcasting or communication, based on a descriptor, which is disposed in transmission data included in a stream transmitted via a broadcast wave of digital broadcasting, and in which information about hybrid delivery using broadcasting and communication is described, and a content control unit controls a function of each unit for performing processing of acquiring content transmitted via broadcasting or communication, based on the acquired control data. The present technology can be applied to, for example, a television receiver.

14 Claims, 18 Drawing Sheets

(51) Int. Cl.
  H04L 29/06    (2006.01)
  H04N 21/845   (2011.01)
  H04N 21/858   (2011.01)
  H04L 29/08    (2006.01)
  H04N 21/8545  (2011.01)
  H04N 21/435   (2011.01)
  H04N 21/61    (2011.01)

(52) U.S. Cl.
  CPC ............ *H04L 65/608* (2013.01); *H04L 65/80* (2013.01); *H04L 67/02* (2013.01); *H04N 21/8456* (2013.01); *H04N 21/8545* (2013.01); *H04N 21/8586* (2013.01); *H04N 21/435* (2013.01); *H04N 21/6112* (2013.01); *H04N 21/6125* (2013.01)

(56) References Cited

FOREIGN PATENT DOCUMENTS

| | | | |
|---|---|---|---|
| JP | 2013-187781 A | 9/2013 | |
| JP | 2015-027082 A | 2/2015 | |
| JP | 2016-505146 A | 2/2016 | |
| WO | 2012/099399 A2 | 7/2012 | |
| WO | 2013/055164 A1 | 4/2013 | |
| WO | 2013/154023 A1 | 10/2013 | |

OTHER PUBLICATIONS

Extended European Search Report of EP Patent Application No. 15755125.0, dated Aug. 17, 2017, 11 pages.
"Digital Video Broadcasting (DVB); Signalling and Carnage of Interactive Applications and Services in Hybrid Broadcast/broadband Environments", ETSI TS 102 809 V1.1.1, Jan. 2010, 98 pages.
"Hybrid Broadcast Broadband TV", ETSI TS 102 796 V1.2.1, Nov. 2012, 88 pages.
Association of Radio Industries and Businesses, "Data Coding and Transmission Specification for Digital Broadcasting", ARIB Standard, ARIB STD-B24 5.8, Jul. 3, 2013, pp. 3.
MIC, "Article 41-3 ultra-high-definition television system Working Group report", Ministry of Internal Affairs and Communication, Jan. 31, 2014, pp. 3.
"Data Coding and Transmission Specification for Digital Broadcasting", ARIB STD-B24, Version 5.8., Jul. 3, 2013, pp. 114-115.
"Network Time Protocol Version 4: Protocol and Algorithms Specification", received from Nishikawa&Associates, May 20, 2015, pp. 11.
Office Action for CN Patent Application No. 201580009599.8, dated Dec. 5, 2018, 05 pages of Office Action and 07 pages of English Translation.
Office Action for JP Patent Application No. 2016-505146, dated Nov. 8, 2018, 03 pages of Office Action and 03 pages of English Translation.
"Data Coding and Transmission Specification for Digital Broadcasting", ARIB STD-B24, Version 5.8, 114-115 pages.
"Document 41-3: Report of Ultra High Definition Television Broadcasting System Working Group", Jan. 31, 2014, 198-167 pages.
Office Action for CN Patent Application No. 201580009599.8, dated Jul. 22, 2019, 05 pages of Office Action and 09 pages of English Translation.
"Hybrid Broadcast Broadband TV", EBU Operating Innovation, ETSI TS 102 796 V1.2.1, Technical Specification, Nov. 2012, 88 pages.
Office Action for JP Patent Application No. 2019-084099, dated Jan. 30, 2020, 05 pages of Office Action and 05 pages of English Translation.
"Document 41-3: Working Group Report of Ultra-High Definition Television Broadcasting System", Soumu, Jan. 30, 2014, pp. 159-167.
"Data Coding and Transmission Specification for Digital Broadcasting ARIB", STD-B24 (Fascicle 3), Version 5.8, Jul. 3, 2013, pp. 114-115.

* cited by examiner

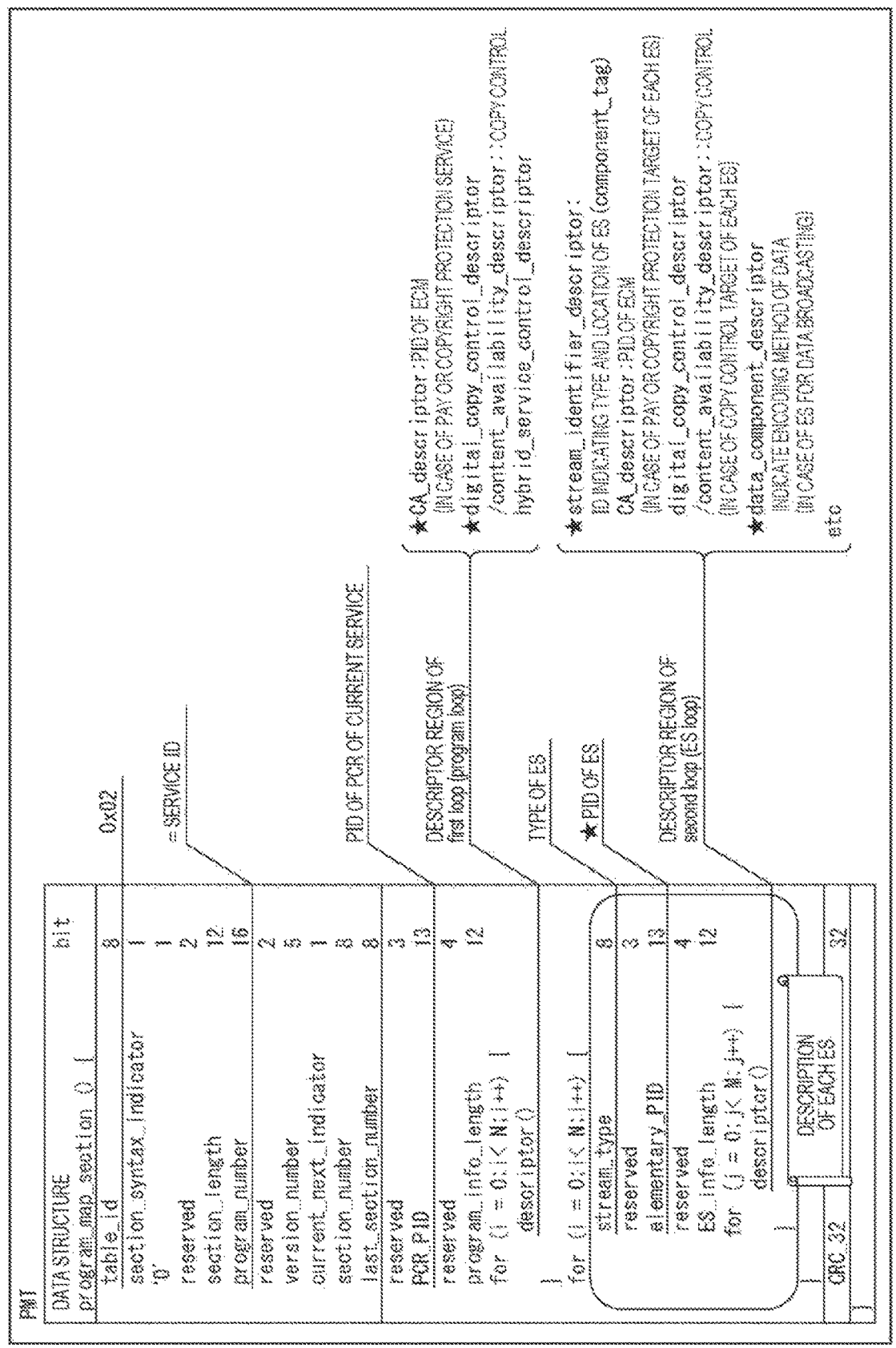

FIG. 6

| hybrid_service_control_descriptor | No. of Bits | Identifier |
|---|---|---|
| hybrid_service_control_descriptor () { | | |
|   descriptor_tag | 8 | uimsbf |
|   descriptor_length | 8 | uimsbf |
|   hybrid_type | 4 | CONTROL DATA TYPE 0:AIT, 1:MPD(A11), 2:MPD(COMMUNICATION ONLY), 3:ER1, 4 OR MORE::reserved |
|   if(hybrid_type==1) { | | |
|     for (i=0;i(N);i++) { | | |
|       url_data_byte | | MPD_Broadcast_Base_URI |
|     } | | |
|   } | | |
|   control_data_transmission_type | 1 | CONTROL DATA TRANSMISSION ROUTE TYPE  0:BROADCASTING  1:COMMUNICATION |
|   sync_base_type | 2 | 0:PCR  1:timeline |
|   reserved | 3 | |
|   control_version | 8 | VERSION OF CONTROL DATA |
|   if (control_data_transmission_type==0) { | | |
|     component_tag | 8 | COMPONENT FOR CONTROL DATA TRANSMISSION |
|     module_id | 16 | MODULE FOR CONTROL DATA TRANSMISSION |
|   } | | |
|   if (control_data_transmission_type==1) { | | |
|     for (i=0;i(N);i++) { | | |
|       url_data_byte | 8 x N | URL OF CONTROL DATA SERVER |
|     } | | |
|   } | | |
| } | | |

US 10,728,610 B2

RECEIVING APPARATUS, RECEIVING METHOD, TRANSMISSION APPARATUS, AND TRANSMISSION METHOD

CROSS REFERENCE TO RELATED APPLICATIONS

This application is a U.S. National Phase of International Patent Application No. PCT/JP2015/053926 filed on Feb. 13, 2015, which claims priority benefit of Japanese Patent Application No. 2014-034957 filed in the Japan Patent Office on Feb. 26, 2014. Each of the above-referenced applications is hereby incorporated herein by reference in its entirety.

TECHNICAL FIELD

The present technology relates to a receiving apparatus, a receiving method, a transmission apparatus, and a transmission method, and particularly to a receiving apparatus, a receiving method, a transmission apparatus, and a transmission method that enable various operation modes to be provided by hybrid delivery using broadcasting and communication.

BACKGROUND ART

In recent years, in the field of digital broadcasting, there has been considered a hybrid-type delivery method using not only broadcasting but also communication (e.g., refer to Patent Document 1).

CITATION LIST

Patent Document

Patent Document 1: Japanese Patent Application Laid-Open No. 2011-66556

SUMMARY OF THE INVENTION

Problems to be Solved by the Invention

If a hybrid-type delivery method using broadcasting and communication is employed, various operation modes can be provided by the cooperation between broadcasting and communication. Nevertheless, a technical system for providing such operation modes has not been established.

The present technology has been devised in view of such situations, and enables various operation modes to be provided by hybrid delivery using broadcasting and communication.

Solutions to Problems

A receiving apparatus according to the first aspect of the present technology includes a receiving unit configured to receive a broadcast wave of digital broadcasting, an acquisition unit configured to acquire control data transmitted via broadcasting or communication, based on a descriptor, which is disposed in transmission data included in a stream transmitted via the broadcast wave, and in which information about hybrid delivery using broadcasting and communication is described, and a control unit configured to control a function of each unit for performing processing of acquiring content transmitted via broadcasting or communication, based on the acquired control data.

The descriptor can include at least type information and location information of the control data.

The content can be constituted by components of a video and an audio, and the control data can be control information of the components that includes at least location information pieces of the components.

The control data can include location information pieces of components transmitted via broadcasting and communication.

The control data can include location information of a component transmitted only via communication.

The content can be an application, and the control data can be control information of the application.

The broadcast wave of digital broadcasting can be compliant with an MPEG2-Transport Stream (TS) standard, the transmission data can be a Program Map Table (PMT), and the control data can be a Media Presentation Description (MPD) or an Application Information Table (AIT).

A receiving method according to the first aspect of the present technology is a receiving method corresponding to the receiving apparatus according to the first aspect of the present technology.

In the receiving apparatus and the receiving method according to the first aspect of the present technology, a broadcast wave of digital broadcasting is received, control data transmitted via broadcasting or communication is acquired based on a descriptor, which is disposed in transmission data included in a stream transmitted via the broadcast wave, and in which information about hybrid delivery using broadcasting and communication is described, and a function of each unit for performing processing of acquiring content transmitted via broadcasting or communication is controlled based on the acquired control data.

A transmission apparatus according to the second aspect of the present technology includes a first acquisition unit configured to acquire content, a second acquisition unit configured to acquire, as information about hybrid delivery using broadcasting and communication, transmission data in which a descriptor is disposed, information for acquiring control data transmitted via broadcasting or communication being described in the descriptor, and a transmission unit configured to transmit a stream including the content and the transmission data, via a broadcast wave of digital broadcasting.

A transmission method according to the second aspect of the present technology is a transmission method corresponding to the transmission apparatus according to the second aspect of the present technology.

In the transmission apparatus and the transmission method according to the second aspect of the present technology, content is acquired, transmission data in which a descriptor is disposed is acquired as information about hybrid delivery using broadcasting and communication, information for acquiring control data transmitted via broadcasting or communication being described in the descriptor, and a stream including the content and the transmission data is transmitted via a broadcast wave of digital broadcasting.

A receiving apparatus according to the third aspect of the present technology includes a receiving unit configured to receive a broadcast wave of digital broadcasting, an acquisition unit configured to acquire control data transmitted via broadcasting or communication, based on transmission data included in a stream transmitted via the broadcast wave, and a control unit configured to control, based on location information pieces of components of a video and an audio constituting content that are included in the acquired control data, a function of each unit for performing processing of acquiring the components transmitted via broadcasting or communication.

The control data can include location information pieces of components transmitted via broadcasting and communication, and an analysis unit configured to resolve a location of a component transmitted via broadcasting can be further included.

In a case in which location information included in the control data includes predetermined information, the analysis unit can identify a component corresponding to the location information, to be transmitted via broadcasting.

A descriptor in which information about hybrid delivery using broadcasting and communication is described can be disposed in the transmission data, and the analysis unit can perform matching between location information included in the descriptor, and location information included in the control data, and identify a component having matched location information, to be transmitted via broadcasting.

The descriptor can include at least type information and location information of the control data, and the acquisition unit can acquire the control data transmitted via broadcasting or communication, based on the descriptor.

The control data can include location information of a component transmitted only via communication, and the control unit can control a function of each unit for performing processing of acquiring the component transmitted via communication, based on location information of the component transmitted only via communication.

The broadcast wave of digital broadcasting can be compliant with an MPEG2-Transport Stream (TS) standard, the transmission data can be a Program Map Table (PMT), and the control data can be a Media Presentation Description (MPD).

A receiving method according to the third aspect of the present technology is a receiving method corresponding to the receiving apparatus according to the third aspect of the present technology.

In the receiving apparatus and the receiving method according to the third aspect of the present technology, a broadcast wave of digital broadcasting is received, control data transmitted via broadcasting or communication is acquired based on transmission data included in a stream transmitted via the broadcast wave, and based on location information pieces of a video and an audio constituting content that are included in the acquired control data, a function of each unit for performing processing of acquiring the components transmitted via broadcasting or communication is controlled.

A transmission apparatus according to the fourth aspect of the present technology includes a first acquisition unit configured to acquire content constituted by components of a video and an audio, a second acquisition unit configured to acquire transmission data including information for acquiring control data including location information pieces of the components of the video and the audio, the control data being transmitted via broadcasting or communication, and a transmission unit configured to transmit a stream including the content and the transmission data, via a broadcast wave of digital broadcasting.

A transmission method according to the fourth aspect of the present technology is a transmission method corresponding to the transmission apparatus according to the fourth aspect of the present technology.

In the transmission apparatus and the transmission method according to the fourth aspect of the present technology, content constituted by components of a video and an audio is acquired, transmission data including information for acquiring control data including location information pieces of the components of the video and the audio, the control data being transmitted via broadcasting or communication, is acquired, and a stream including the content and the transmission data is transmitted via a broadcast wave of digital broadcasting.

In addition, the receiving apparatus according to the first or third aspect of the present technology may be an independent apparatus, or may be an internal block constituting a single apparatus. In addition, the transmission apparatus according to the second or fourth aspect of the present technology may be an independent apparatus, or may be an internal block constituting a single apparatus.

Effects of the Invention

According to the first to fourth aspects of the present technology, various operation modes can be provided by hybrid delivery using broadcasting and communication.

The effect described here is not necessarily limited, and may be any effect described in the present disclosure.

BRIEF DESCRIPTION OF DRAWINGS

FIG. 5 is a diagram illustrating a syntax of a PMT.

FIG. 6 is a diagram illustrating a syntax of a hybrid service control descriptor.

MODE FOR CARRYING OUT THE INVENTION

An embodiment of the present technology will be described below with reference to the drawings. Assume that the description will be given in the following order.

1. Hybrid Delivery Using Broadcasting and Communication to Which Present Technology Is Applied
2. Structure of Signaling
3. Control Range of MPD
4. System Configuration
5. Flow of Specific Processing Executed in Each Apparatus
6. Configuration of Computer <1. Hybrid Delivery Using Broadcasting and Communication to Which Present Technology is Applied>

(1) Operation Example 1 of Hybrid Delivery

Figure 1:
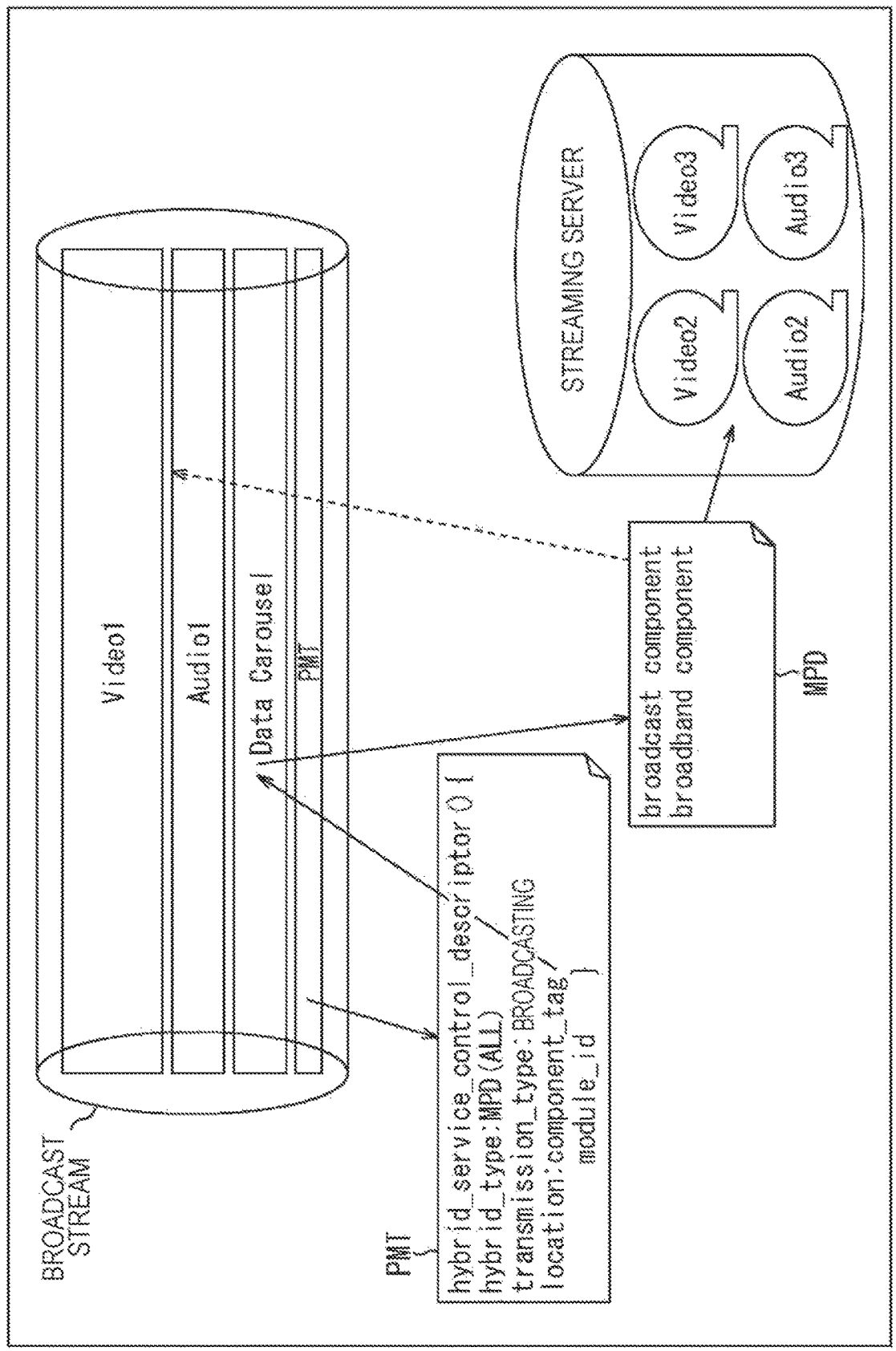
FIG. 1 is a diagram illustrating Operation Example 1 of hybrid delivery.

FIG. 1 is a diagram illustrating an example of hybrid delivery employed in the case of delivering control data and video and audio streams via broadcasting, and delivering video and audio streams via communication.

In FIG. 1, a transmitter of a broadcasting station (broadcasting operator) transmits, via a broadcast wave of digital broadcasting, a broadcast stream obtained by multiplexing streams of a video (Video1) and an audio (Audio1), a data carousel (Data Carousel), and transmission data (e.g., PMT, etc.). In addition, a streaming server is provided on a network. Via the network, the streaming server performs streaming delivery of videos (Video2, Video3) and audios (Audio2, Audio3). Here, the broadcast wave of digital broadcasting is compliant with the MPEG2-Transport Stream (TS) standard. In addition, video and audio streams are delivered via at least either broadcasting or communication.

As illustrated in FIG. 1, a receiver installed in each house or the like receives the broadcast wave of digital broadcasting transmitted from the transmitter, and acquires a PMT transmitted by the broadcast stream. Here, a Program Map Table (PMT) is a table for storing Packet Identifiers (PIDs) for extracting TS packets of videos and audios, and the like, and is an example of transmission data. In addition, a hybrid service control descriptor is disposed in the PMT. In the hybrid service control descriptor (hybrid_service_control_descriptor), information about control data such as type information and location information is described.

The control data is information for controlling various types of content. In Operation Example 1 illustrated in FIG. 1, content is a moving image constituted by components of a video and an audio of a program or the like, for example. In this case, an MPD is used as control data. A Media Presentation Description (MPD) includes location information (Base URL) of each component transmitted via broadcasting or communication. The MPD is described in a markup language such as an Extensible Markup Language (XML), for example.

In the hybrid service control descriptor illustrated in FIG. 1, it is designated as type information that an MPD serving as control data is transmitted via broadcasting. In this case, in the hybrid service control descriptor, a component tag (component_tag) and a module ID (module_id) for acquiring an MPD transmitted by a data carousel are designated as location information. The receiver can thereby acquire a file of an MPD from a specific module transmitted by a data carousel, according to the component tag and the module ID.

In the MPD, location information pieces (BaseURLs) of a component transmitted via broadcasting (broadcast component) and a component transmitted via communication (broadband component) are designated. The receiver can thereby acquire, according to an analysis result of the MPD, components of the video (Video1) and the audio (Audio1) from the broadcast stream, if the components are transmitted via broadcasting. In addition, the receiver can acquire, according to the analysis result of the MPD, components of the streaming-delivered videos (Video2, Video3) and the audios (Audio2, Audio3), by accessing the streaming server, if the components are transmitted via communication.

In addition, in Operation Example 1 illustrated in FIG. 1, an MPD (ALL) is designated in the hybrid service control descriptor. Thus, location information pieces of the component transmitted via broadcasting and the component transmitted via communication are designated in the MPD. If an MPD (communication only) is designated, only location information of the component transmitted via communication is designated in the MPD.

In this manner, based on the hybrid service control descriptor disposed in the PMT, the receiver acquires the MPD transmitted via broadcasting, and acquires components of the video and the audio transmitted via broadcasting or communication. Then, videos and audios corresponding to these components are output, so that a program becomes viewable.

(2) Operation Example 2 of Hybrid Delivery

Figure 2:
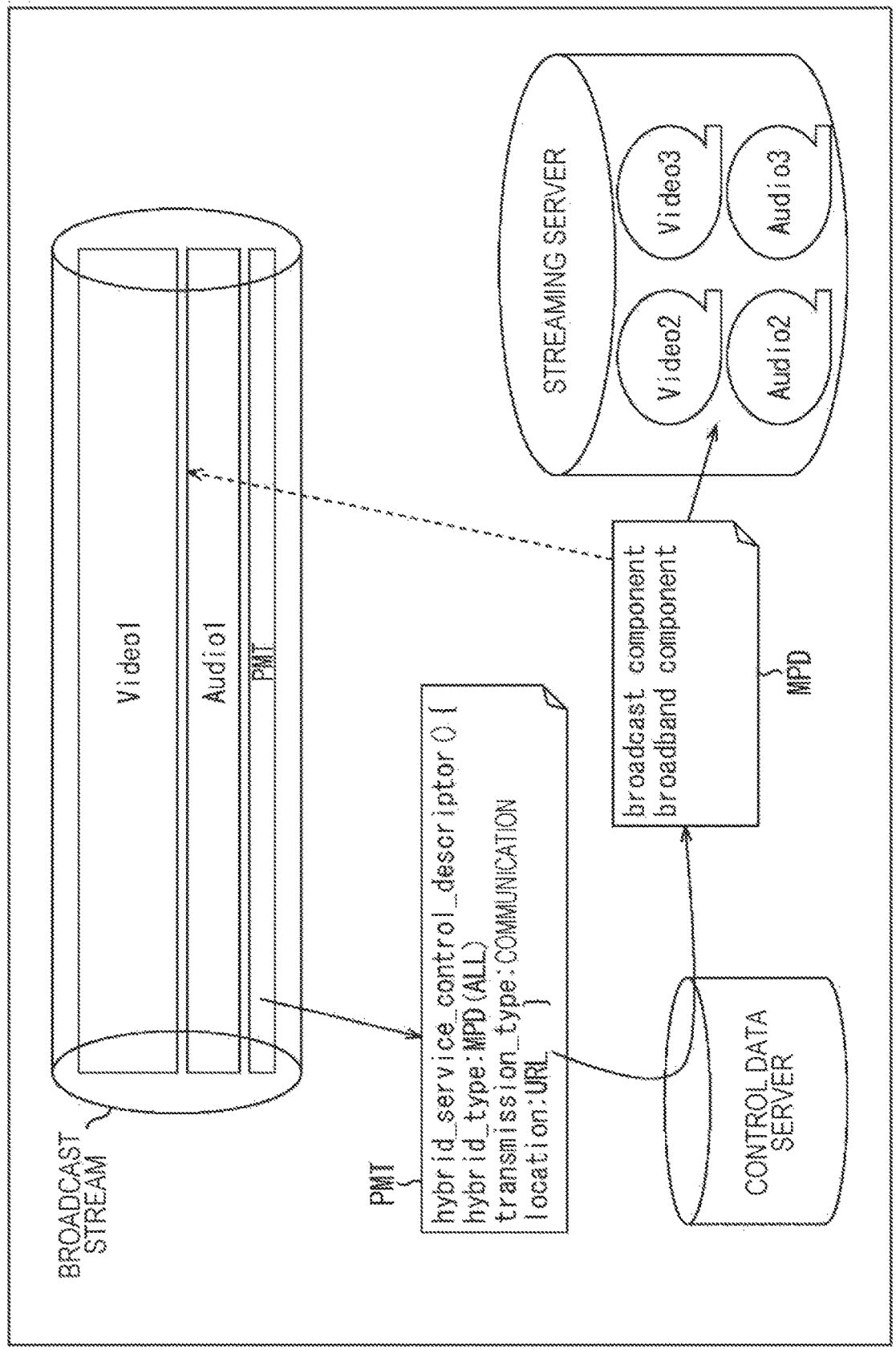
FIG. 2 is a diagram illustrating Operation Example 2 of hybrid delivery.

FIG. 2 is a diagram illustrating an example of hybrid delivery employed in the case of delivering video and audio streams via broadcasting, and delivering control data and video and audio streams via communication.

In FIG. 2, a transmitter of a broadcasting station transmits, via a broadcast wave of digital broadcasting, a broadcast stream obtained by multiplexing streams of a video (Video1) and an audio (Audio1), and transmission data (e.g., PMT, etc.). In addition, a streaming server and a control data server are provided on a network. Via the network, the streaming server performs streaming delivery of videos (Video2, Video3) and audios (Audio2, Audio3). In addition, the control data server delivers an MPD via the network.

As illustrated in FIG. 2, a receiver installed in each house or the like receives the broadcast wave of digital broadcasting transmitted from the transmitter, and acquires a PMT transmitted by the broadcast stream. In a hybrid service control descriptor disposed in the PMT, it is designated as type information that an MPD is transmitted via communication. In this case, in the hybrid service control descriptor, a URL of the control data server is designated as location information. The receiver can thereby acquire the MPD by accessing the control data server via the network according to the URL of the control data server.

In the MPD, location information pieces (Base URLs) of a component transmitted via broadcasting (broadcast component) and a component transmitted via communication (broadband component) are designated. The receiver can thereby acquire, according to an analysis result of the MPD, components of the video (Video1) and the audio (Audio1) from the broadcast stream, if the components are transmitted via broadcasting. In addition, the receiver can acquire, according to the analysis result of the MPD, components of the streaming-delivered videos (Video2, Video3) and the audios (Audio2, Audio3), by accessing the streaming server, if the components are transmitted via communication.

In addition, in Operation Example 2 illustrated in FIG. 2, an MPD (ALL) is designated in the hybrid service control descriptor. Thus, location information pieces of the component transmitted via broadcasting and the component transmitted via communication are designated in the MPD. If an MPD (communication only) is designated, only location information of the component transmitted via communication is designated in the MPD.

In this manner, based on the hybrid service control descriptor disposed in the PMT, the receiver acquires the MPD transmitted via communication, and acquires components of a video and an audio transmitted via broadcasting or communication. Then, videos and audios corresponding to these components are output, so that a program becomes viewable.

(3) Operation Example 3 of Hybrid Delivery

Figure 3:
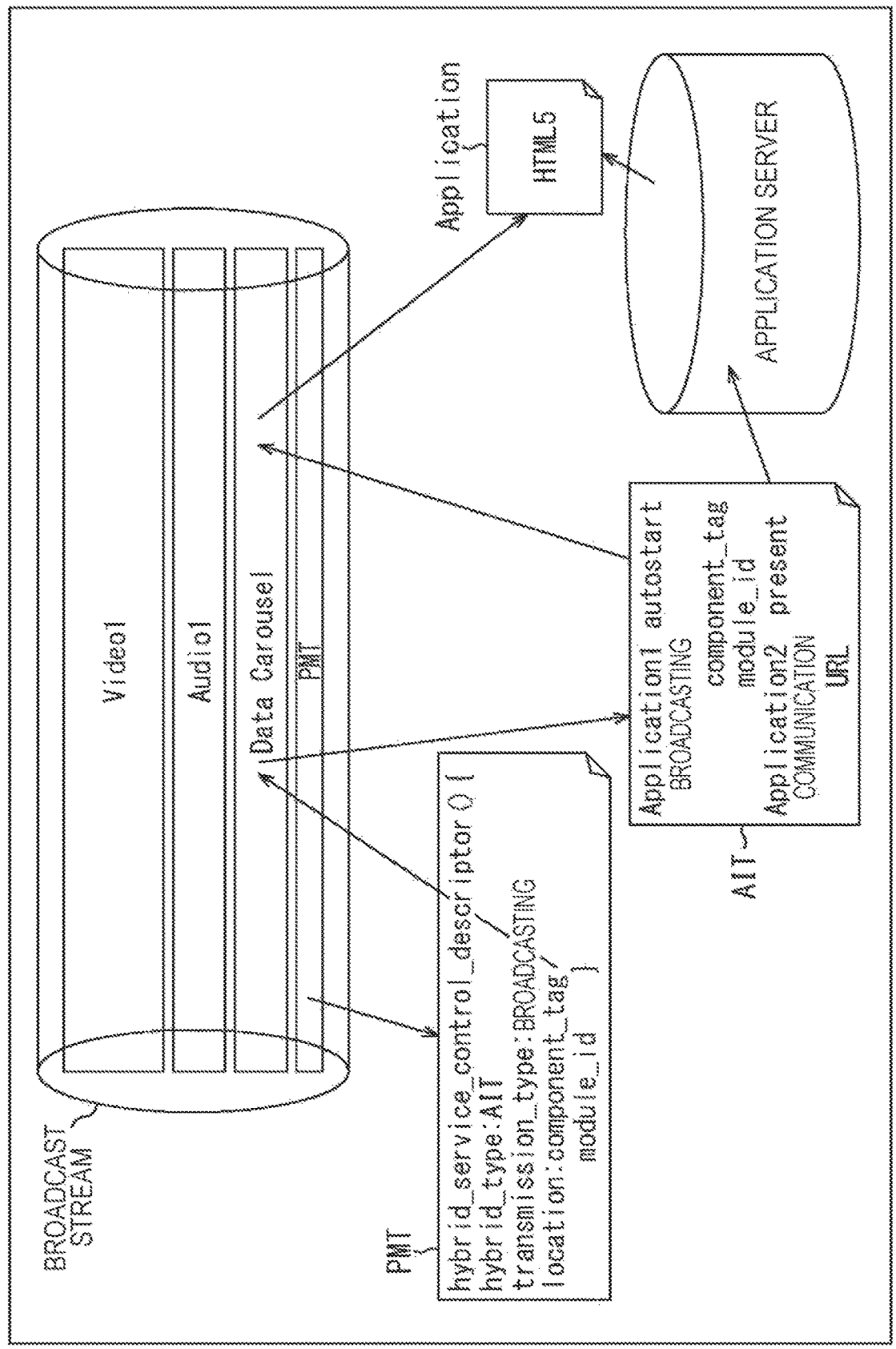
FIG. 3 is a diagram illustrating Operation Example 3 of hybrid delivery.

FIG. 3 is a diagram illustrating an example of hybrid delivery employed in the case of delivering video and audio streams, control data, and an application via broadcasting, and delivering an application via communication.

In FIG. 3, a transmitter of a broadcasting station transmits, via a broadcast wave of digital broadcasting, a broadcast stream obtained by multiplexing streams of a video (Video1) and an audio (Audio1), a data carousel (Data Carousel), and transmission data (e.g., PMT, etc.). In addition, an application server is provided on a network. The application server performs delivery of applications via the network. Here, the broadcast wave of digital broadcasting is compliant with the MPEG2-TS standard. In addition, applications are delivered via at least either broadcasting or communication. Furthermore, applications are created by a markup language such as a HyperText Markup Language 5 (HTML5), for example.

As illustrated in FIG. 3, a receiver installed in each house or the like receives the broadcast wave of digital broadcasting transmitted from the transmitter, and acquires a PMT transmitted by the broadcast stream. In a hybrid service control descriptor disposed in the PMT, information about control data such as type information and location information is described. The control data is information for controlling various types of content. In FIG. 3 and Operation Example 3, content is an application executed in conjunction with a program or the like. In this case, an AIT is used as control data. An Application Information Table (AIT) is application control information for controlling a function of an application. For example, the AIT is described in a markup language such as an XML, and includes a control command such as "auto start", and location information such as a URL of the application server.

In the hybrid service control descriptor illustrated in FIG. 3, it is designated as type information that an AIT serving as control data is transmitted via broadcasting. In this case, in the hybrid service control descriptor, a component tag (component_tag) and a module ID (module_id) for acquiring an AIT transmitted by a data carousel are designated as location information. The receiver can thereby acquire a file of an AIT from a specific module transmitted by a data carousel, according to the component tag and the module ID.

In the AIT, location information of at least either an application transmitted via broadcasting (e.g., Application1) or an application transmitted via communication (e.g., Application2) is designated. The receiver can thereby acquire, according to an analysis result of the AIT, the application (Application1) from a specific module transmitted by a data carousel, according to the component tag and the module ID, if the application (Application1) is transmitted via broadcasting. Nevertheless, in the description example of the AIT illustrated in FIG. 3, "auto start" is designated as a control command for the application (Application1) transmitted via broadcasting. Thus, in the receiver, the application (Application1) is immediately executed (automatically executed) after the application (Application1) is acquired.

In addition, according to the analysis result of the AIT, the receiver can acquire the application (Application2) by accessing the application server via the network according to the URL of the application server, if the application (Application2) is transmitted via communication. Nevertheless, in the description example of the AIT illustrated in FIG. 3, "present" is designated as a control command for the application (Application2) transmitted via communication. Thus, in the receiver, the application (Application2) is not automatically executed after the application (Application2) is acquired.

In this manner, based on the hybrid service control descriptor disposed in the PMT, the receiver acquires the AIT transmitted via broadcasting, and acquires an application transmitted via broadcasting or communication. Then, information about the application is presented in conjunction with a program.

(4) Operation Example 4 of Hybrid Delivery

Figure 4:
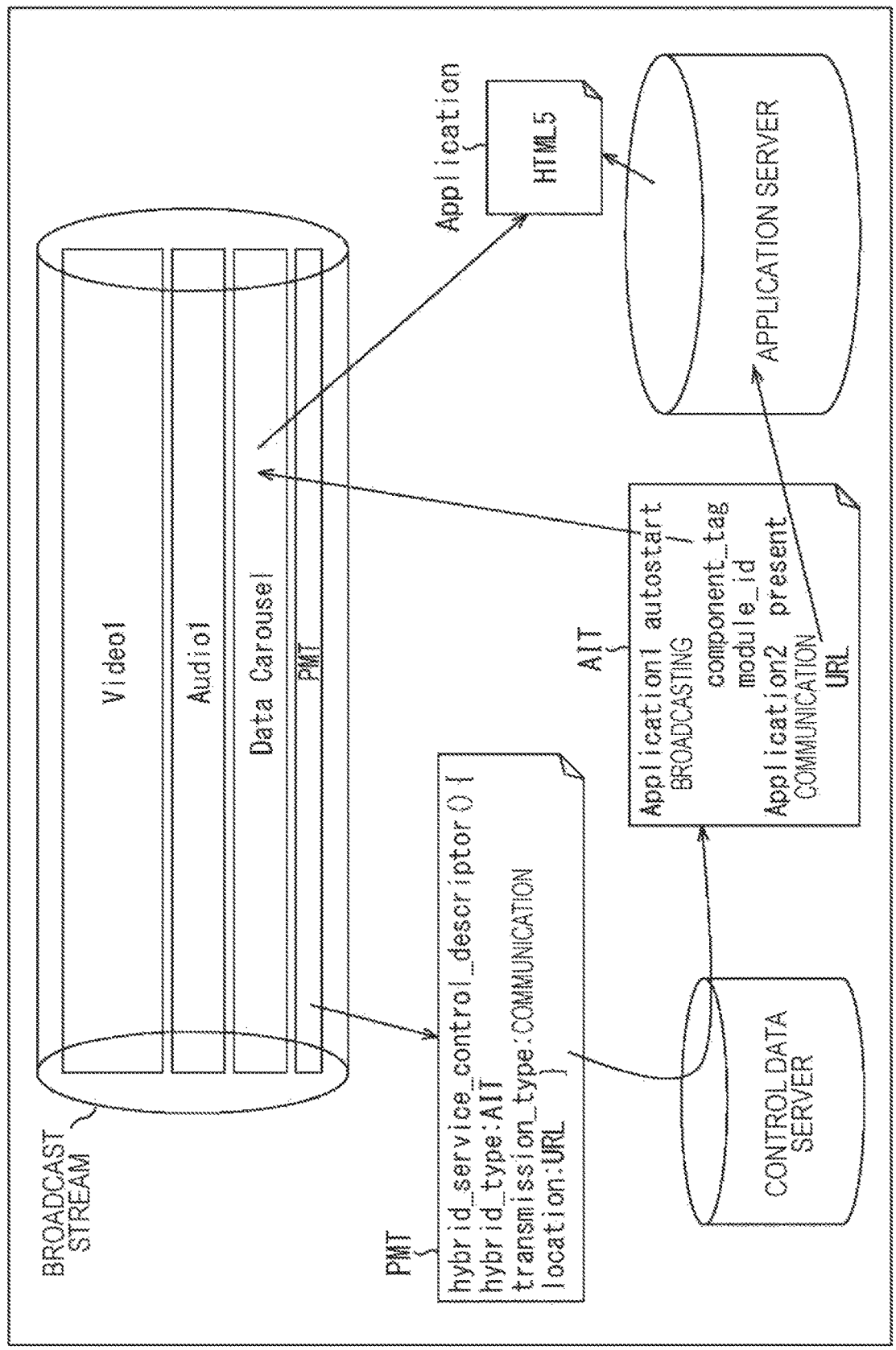
FIG. 4 is a diagram illustrating Operation Example 4 of hybrid delivery.

FIG. 4 is a diagram illustrating an example of hybrid delivery employed in the case of delivering video and audio streams and an application via broadcasting, and delivering control data and an application via communication.

In FIG. 4, a transmitter of a broadcasting station transmits, via a broadcast wave of digital broadcasting, a broadcast stream obtained by multiplexing streams of a video (Video1) and an audio (Audio1), a data carousel (Data Carousel), and transmission data (e.g., PMT, etc.). In addition, an application server and a control data server are provided on a network. The application server performs delivery of applications via the network. In addition, the control data server delivers an AIT via the network. Here, applications are delivered via at least either broadcasting or communication.

As illustrated in FIG. 4, a receiver installed in each house or the like receives the broadcast wave of digital broadcasting transmitted from the transmitter, and acquires a PMT transmitted by the broadcast stream. In a hybrid service control descriptor disposed in the PMT, it is designated as type information that an AIT is transmitted via communication. In this case, in the hybrid service control descriptor, a URL of the control data server is designated as location information. The receiver can thereby acquire the AIT by accessing the control data server via the network according to the URL of the control data server.

In the AIT, location information of at least either an application transmitted via broadcasting (e.g., Application1) or an application transmitted via communication (e.g., Application2) is designated. The receiver can thereby acquire, according to an analysis result of the AIT, the application (Application1) from a specific module transmitted by a data carousel, according to the component tag and the module ID, if the application (Application1) is transmitted via broadcasting. Nevertheless, in the description example of the AIT illustrated in FIG. 4, "auto start" is designated as a control command for the application (Application1) transmitted via broadcasting. Thus, in the receiver, the application (Application1) is immediately executed (automatically executed) after the application (Application1) is acquired.

In addition, according to the analysis result of the AIT, the receiver can acquire the application (Application2) by accessing the application server via the network according to the URL of the application server, if the application (Application2) is transmitted via communication. Nevertheless, in the description example of the AIT illustrated in FIG. 4, "present" is designated as a control command for the application (Application2) transmitted via communication. Thus, in the receiver, the application (Application2) is not automatically executed after the application (Application2) is acquired.

In this manner, based on the hybrid service control descriptor disposed in the PMT, the receiver acquires the AIT transmitted via communication, and acquires an application transmitted via broadcasting or communication. Then, information about the application is presented in conjunction with a program.

<2. Structure of Signaling>
(Structure of PMT)

FIG. 5 is a diagram illustrating a syntax of a Program Map Table (PMT).

Identification information of the PMT is described in a table_id. "1" is described in a section_syntax_indicator. A section length of the PMT is described in a section_length. A service ID of a current service is described in a program_number.

Version information is described in a version_number. "1" is described in a current_next_indicator. "0x00" is described in a section_number. "0x00" is described in a last_section_number.

A Packet Identifier (PID) of Program Clock reference (PCR) of the current service is described in a PCR_PID. A loop length of a first loop (program loop) is described in a program_info_length. In addition, a CA_descriptor, which is a descriptor used in a pay/copyright protection service, a digital_copy_control_descriptor, which is a descriptor used in copy control, and the like are described in descriptor( ) in the program loop. In addition, the above-described hybrid service control descriptor (hybrid_service_control_descriptor) is described in the descriptor( ) in the program loop.

A stream_type, an elementary_PID, and an ES_info length are described in a second loop (ES loop). Current stream format identification is described in the stream_type. A PID of a TS packet for transmitting a relevant elementary stream or payload is described in the elementary_PID. The length of a subsequent ES descriptor is described in the ES_info_length.

For example, a stream_identifier_descriptor, in which an ID (component_tag) indicating the type and the location of an elementary stream is described, a CA_descriptor used in a pay/copyright protection service of each elementary stream, a digital_copy_control_descriptor (content_availability_descriptor) used in copy control of each elementary stream, a data_component_descriptor indicating a data encoding method, and the like are described in descriptor( ) in the ES loop.

(Structure of Hybrid Service Control Descriptor)

FIG. 6 is a diagram illustrating a syntax of a hybrid service control descriptor (hybrid_service_control_descriptor).

A tag value indicating the descriptor is described in a descriptor_tag. A descriptor length of the descriptor is described in a descriptor_length.

Type information of control data is described in a hybrid_type. For example, "0", "1", "2", or "3" is described as the type information. "0" indicates that control data is an AIT. In addition, "1" and "2" both indicate that control data is an MPD. "1" indicates that the MPD corresponds to the entire hybrid delivery using broadcasting and communication, whereas indicates that the MPD corresponds only to adaptive streaming delivery using communication. "3" indicates that control data is a metafile (e.g., ERI) corresponding to a specific service. In addition, a value equal to or larger than "4" is reserved for future expansion.

If "1" is designated as a hybrid_type, a uri_data_byte is described. An MPD_Broadcast_Base_URI is described in the uri_data_byte. Based on the description of the MPD_Broadcast_Base_URI, a URL can be resolved according to the MTEG2-TS by performing matching with location information (Base URL) of an MPD if the MPD corresponds to the entire hybrid delivery using broadcasting and communication.

Type information of a transmission route of control data is described in a control_data_transmission type. For example, or "1" is designated as the type information. If "0" is designated, it is indicated that control data is transmitted via broadcasting. In addition, if "1" is designated, it is indicated that control data is transmitted via communication.

Type information about synchronization is described in a sync_base_type. For example, "0" or "1" is designated as the type information. If "0" is designated, it is indicated that synchronization is performed using Program Clock Reference (PCR). In addition, if "1" is designated, it is indicated that synchronization is performed based on an absolute time using a timeline (timeline), i.e., a Network Time Protocol (NTP). Version information of control data is described in a control_version.

If "0" is designated as the control_data_transmission_type, i.e., if control data is transmitted via broadcasting, a component_tag and a module_id are described. A component for transmitting control data is designated in the component_tag. A module ID of a module for transmitting control data is designated in the module_id.

If "1" is designated as the control_data_transmission_type, i.e., if control data is transmitted via communication, a uri_data_byte is described. A URL of a control data server for delivering control data is designated in the uri_data_byte.

<3. Control Range of MPD>

As described above, in some cases, only location information of a component transmitted via communication is described in the MPD. In other cases, together with the location information of the component transmitted via communication, location information of a component transmitted via broadcasting is described in the MPD. The control range of the MPD varies according to such a difference in descriptions. Thus, the control range of the MPD will be described next using specific examples.

(1) Specific Example 1 of Control Range of MPD

Figure 7:
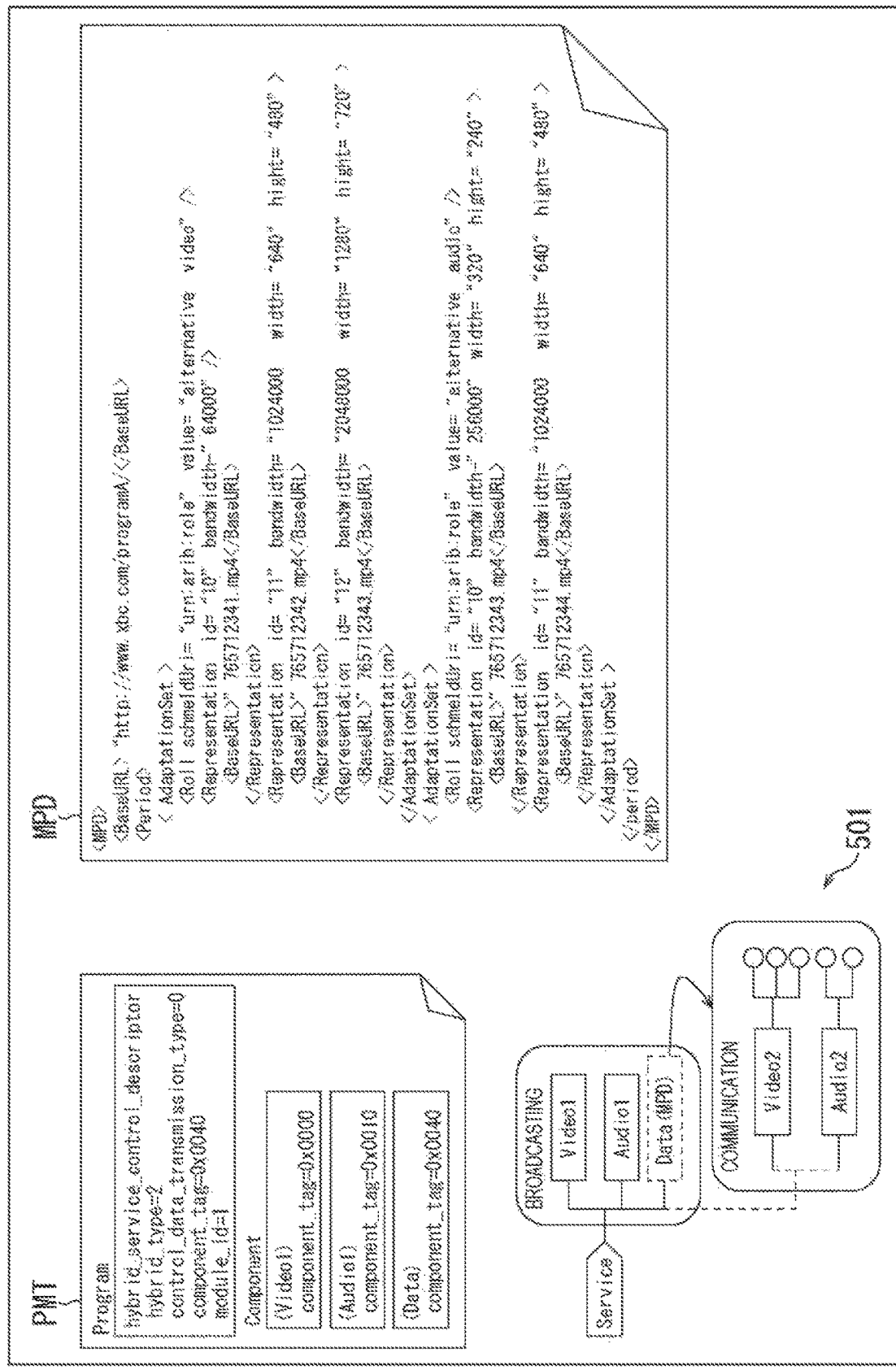
FIG. 7 is a diagram illustrating Specific Example 1 of a control range of an MPD.

FIG. 7 is a diagram illustrating a specific example used in a case in which a control range of an MPD is communication only.

In FIG. 7, as represented by a data structure 501 of a service, among components constituting a specific service (Service), components of a main video 1 (Video1) and a main audio 1 (Audio1) are transmitted via broadcasting, and components of an alternative video 2 (Video2) and an alternative audio 2 (Audio2) are transmitted via communication. Here, a plurality of components (indicated by circles in FIG. 7) different in bit rate or the like is prepared for the video 2 (Video2) and the audio 2 (Audio2), and so-called adaptive streaming delivery is performed according to a dynamic change in a communication status. In addition, the MPD serving as control data (Data) is transmitted by a data carousel.

A hybrid service control descriptor (hybrid_service_control_descriptor) is disposed in a program loop (program loop) of the PMT illustrated in FIG. 7. In the hybrid service control descriptor, "2" is designated as a hybrid_type. Thus, a control range of the MPD is communication only. In this case, since the control range of the MPD is communication only, components of the video 1 and the audio 1 transmitted via broadcasting are acquired according to values of the respective component tags in the ES loop of the PMT (component_tag="0x0000", "0x0010").

In addition, "0" is designated as the control_data_transmission_type, indicating that the MPD is transmitted via broadcasting. Thus, the receiver acquires the MPD from a specific module transmitted by a data carousel, according to the value of the component tag (component_tag="0x0040") and the value of the module ID (module_id="1").

FIG. 7 illustrates a description example of an MPD acquired in this manner. As illustrated in the description example of the MPD, as components of the video 2 (alternative video) transmitted via communication, 3 files different in bit rate or the like (765712341.mp4, 765712342.mp4, 765712343.mp4) are prepared. In addition, as components of the audio 2 (alternative audio) transmitted via communication, 2 files different in bit rate or the like (765712343.mp4, 765712344.mp4) are prepared.

In addition, URLs of these files are represented by character strings obtained by combining "http://www.xbc.com/programA/" designated by a BaseURL element and the respective file names (e.g., "765712341.mp4"). Thus, by accessing the streaming server according to these URLs, the receiver can adaptively acquire the components (files) of the video 2 and the audio 2 transmitted via communication, according to a dynamic change in a communication status.

As described above, in a case in which the control range of the MPD is communication only, in the MPD, only information about adaptive streaming delivery using communication is designated. Thus, when the alternative video 2 and the alternative audio 2 are viewed and listened, the receiver adaptively acquires, according to the MPD, the components (files) of the video 2 and the audio 2 according to a dynamic change in a communication status, and outputs the video and audio thereof.

In addition, referring to FIG. 7, the description has been given of the case of transmitting the MPD via broadcasting. Nevertheless, in the case of transmitting the MPD via communication, in the hybrid service control descriptor, "1" is designated as the control_data_transmission_type, and furthermore, the URL of the control data server is designated. The receiver therefore acquires the MPD by accessing the control data server according to the URL.

(2) Specific Example 2 of Control Range of MPD

Figure 8:
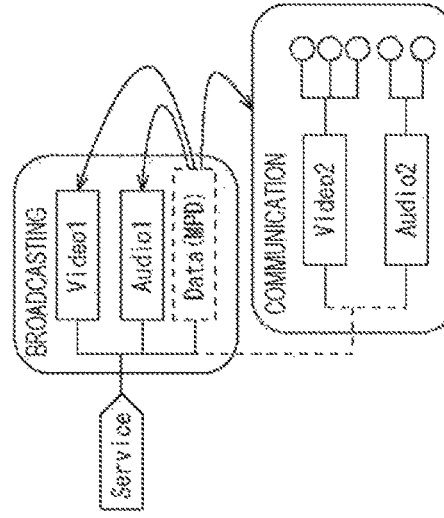
FIG. 8 is a diagram illustrating Specific Example 2 of a control range of an MPD.

FIG. 8 is a diagram illustrating a specific example used in a case in which a control range of an MPD is broadcasting and communication.

In a data structure 502 of a service illustrated in FIG. 8, similarly to the data structure 501 illustrated in FIG. 7, among components constituting a specific service (Service), components of a main video 1 (Video1) and a main audio 1 (Audio1) are transmitted via broadcasting, and components of an alternative video 2 (Video2) and an alternative audio 2 (Audio2) are transmitted via communication. In addition, the MPD serving as control data (Data) is transmitted by a data carousel.

A hybrid service control descriptor (hybrid_service_control_descriptor) is disposed in a program loop (program loop) of the PMT illustrated in FIG. 8. In the hybrid service control descriptor, "1" is designated as a hybrid_type. Thus, a control range of the MPD is both broadcasting and communication.

In addition, "0" is designated as the control_data_transmission_type, indicating that the MPD is transmitted via broadcasting. Thus, the receiver acquires the MPD from a specific module transmitted by a data carousel, according to the value of the component tag (component_tag="0x0040") and the value of the module ID (module_id="1").

FIG. 8 illustrates a description example of an MPD acquired in this manner. In this description example of the MPD, all components constituting a specific service that include not only components transmitted via communication, but also components transmitted via broadcasting are described. In addition, in the MPD, location information of each component is designated by a corresponding URL. Nevertheless, if a character string of a BaseURL includes a character "B", it is determined that a current component is transmitted via broadcasting.

For example, "B/0x0000" is designated in a BaseURL element of the first AdaptationSet element, and this includes a character "B". Thus, the main video 1 (main video) is determined (identified) to be transmitted via broadcasting.

In addition, for example, "B/0x0010" is designated in a BaseURL element of the second AdaptationSet element, and this includes a character "B". Thus, the main audio 1 (main audio) is determined (identified) to be transmitted via broadcasting. In addition, a character string following "B/" in the BaseURL element corresponds to the value of a component tag of a corresponding component.

Then, components of the video 1 and the audio 1 transmitted via broadcasting are acquired according to the values of the respective component tags (component_tag=0x0000, "0x0010").

In contrast, for example, "765712341.mp4", "765712342.mp4", and "765712343.mp4" are designated in the respective BaseURL elements of the third AdaptationSet element, and these character strings do not include a character "B". It is therefore determined (identified) that the alternative video 2 (alternative video) is not transmitted via broadcasting, i.e., is transmitted via communication.

In addition, for example, "765712343.mp4" and "765712344.mp4" are designated in the respective BaseURL elements of the fourth AdaptationSet element, and these character strings do not include a character "B", either. It is therefore determined (identified) that the alternative audio 2 (alternative audio) is transmitted via communication.

Then, by accessing the streaming server according to the URLs of these files, the receiver can adaptively acquire the components (files) of the video 2 and the audio 2 transmitted via communication, according to a dynamic change in a communication status.

As described above, in a case in which the control range of the MPD is broadcasting and communication, location information pieces of all the components transmitted via broadcasting and communication are described in the MPD. Thus, by resolving a URL according to the URL rule of the MPD (e.g., whether a character "B" is included), the receiver can determine (identify) via which of broadcasting and communication each component constituting a specific service is transmitted.

In addition, in the description given with reference to FIG. 8, a character "B" is used as a character used for determining whether a component is transmitted via broadcasting. Nevertheless, the character is not limited to this. For example, information such as other characters, character strings, numerical values, and symbols may be used as a determination condition.

In addition, referring to FIG. 8, the description has been given of the case of transmitting the MPD via broadcasting. Nevertheless, in the case of transmitting the MPD via communication, in the hybrid service control descriptor, "1" is designated as the control_data_transmission_type, and furthermore, the URL of the control data server is designated. The receiver therefore acquires the MPD by accessing the control data server according to the URL.

(3) Specific Example 3 of Control Range of MPD

Figure 9:
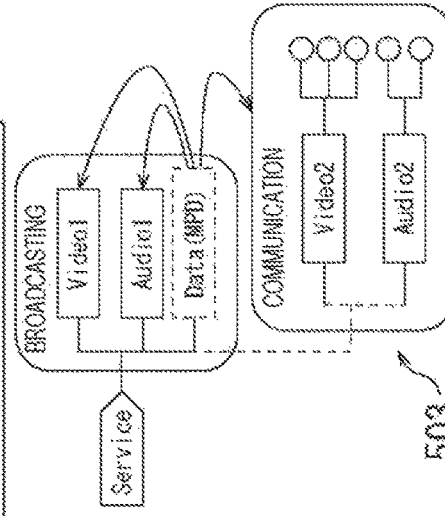
FIG. 9 is a diagram illustrating Specific Example 3 of a control range of an MPD.

FIG. 9 is a diagram illustrating another specific example used in a case in which a control range of an MPD is broadcasting and communication.

In a data structure 503 of a service illustrated in FIG. 9, similarly to the data structure 501 illustrated in FIG. 7 and the data structure 502 illustrated in FIG. 8, among components constituting a specific service (Service), components of a main video 1 (Video1) and a main audio 1 (Audio1) are transmitted via broadcasting, and components of an alternative video 2 (Video2) and an alternative audio 2 (Audio2) are transmitted via communication. In addition, the MPD serving as control data (Data) is transmitted by a data carousel.

A hybrid service control descriptor (hybrid_service_control_descriptor) is disposed in a program loop (program loop) of the PMT illustrated in FIG. 9. In the hybrid service control descriptor, "1" is designated as a hybrid_type. Thus, a control range of the MPD is both broadcasting and communication. In addition, "http://www.xbc.com/programA/main/" is designated as an MPD_Broadcast_Base_URI.

In addition, "0" is designated as the control_data_transmission_type, indicating that the MPD is transmitted via broadcasting. Thus, the receiver acquires the MPD from a specific module transmitted by a data carousel, according to the value of the component tag (component_tag="0x0040") and the value of the module ID (module_id="1").

FIG. 9 illustrates a description example of an MPD acquired in this manner. In this description example of the MPD, all components constituting a specific service that include not only components transmitted via communication, but also components transmitted via broadcasting are described. In addition, in the MPD, location information of each component is designated by a corresponding URL. By performing matching with the MPD_Broadcast_Base_URI and the component tag included in the PMT, it is determined whether a current component is transmitted via transmitted via broadcasting.

More specifically, "http://www.xbc.com/programA/main/" is designated in the MPD_Broadcast_Base_URI of the hybrid service control descriptor of the PMT, and the component tag of the video 1 is "0x0000". Thus, matching between these pieces of information and location information (BaseURL) of the MPD is performed. As a result, "main/0x0000" is designated in the BaseURL element of the first AdaptationSet element, and this matches "http://www.xbc.com/programA/main/0x0000". It is therefore determined (identified) that the main video 1 (main video) is transmitted via broadcasting.

In addition, by performing matching between the MPD_Broadcast_Base_URI and information of the component tag of the audio 1, and location information (BaseURL) of the MPD, since "main/0x0010" is designated in the BaseURL element of the second AdaptationSet element, and this matches "http://www.xbc.com/programA/main/0x0010", it is determined (identified) that the main audio 1 (main audio) is transmitted via broadcasting.

Then, components of the video 1 and the audio 1 transmitted via broadcasting are acquired according to the values of the respective component tags (component_tag="0x0000", "0x0010").

In contrast, for example, "765712341.mp4", "765712342.mp4", and "765712343.mp4" are designated in the respective BaseURL elements of the third AdaptationSet element, and these URLs do not match the MPD_Broadcast_Base_URI and the information of the component tag. It is therefore determined (identified) that the alternative video 2 (alternative video) is not transmitted via broadcasting, i.e., is transmitted via communication.

In addition, for example, "765712343.mp4" and "765712344.mp4" are designated in the respective BaseURL elements of the fourth AdaptationSet element, and these URLs do not match the MPD_Broadcast_Base_URI and the information of the component tag, either. It is therefore determined (identified) that the alternative audio 2 (alternative audio) is transmitted via communication.

Then, by accessing the streaming server according to the URLs of these files, the receiver can adaptively acquire the components (files) of the video 2 and the audio 2 transmitted via communication, according to a dynamic change in a communication status.

As described above, in a case in which the control range of the MPD is broadcasting and communication, location information pieces of all the components transmitted via broadcasting and communication are described in the MPD. Thus, by resolving a URL according to the designation of a BaseURL of the MPD (e.g., whether the URL matches "http://www.xbc.com/programA/main/0x0000"), the receiver can determine (identify) via which of broadcasting and communication each component constituting a specific service is transmitted.

In addition, referring to FIG. 9, the description has been given of the case of transmitting the MPD via broadcasting. Nevertheless, in the case of transmitting the MPD via communication, in the hybrid service control descriptor, "1" is designated as the control_data_transmission_type, and furthermore, the URL of the control data server is designated. The receiver therefore acquires the MPD by accessing the control data server according to the URL.

<4. System Configuration>

(Configuration Example of Broadcast Communication Cooperation System)

Figure 10:
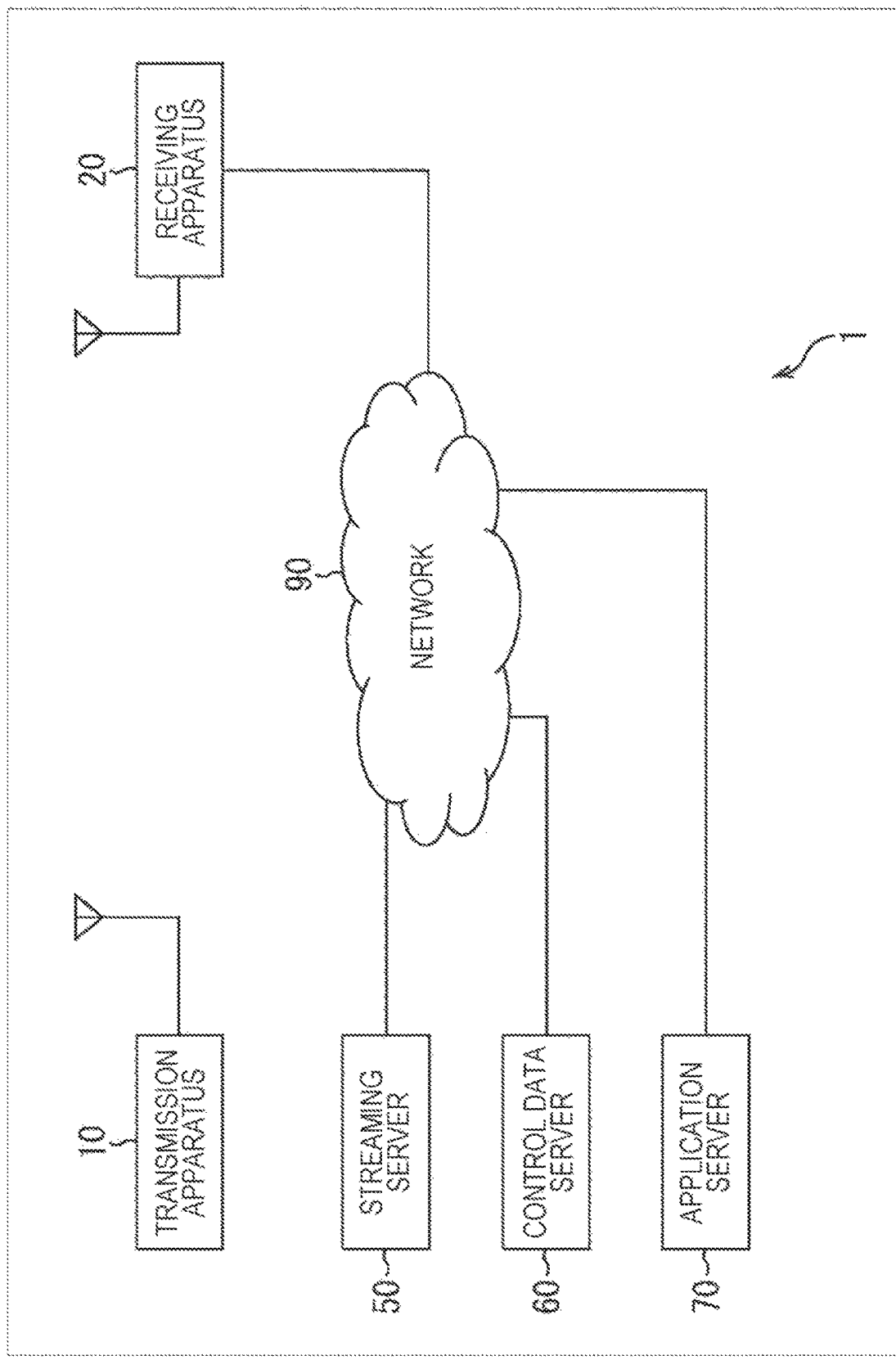
FIG. 10 is a diagram illustrating a configuration of an embodiment of a broadcast communication cooperation system to which the present technology is applied.

FIG. 10 is a diagram illustrating a configuration of an embodiment of a broadcast communication cooperation system to which the present technology is applied.

As illustrated in FIG. 10, a broadcast communication cooperation system 1 includes a transmission apparatus 10, a receiving apparatus 20, a streaming server 50, a control data server 60, and an application server 70. In addition, the receiving apparatus 20 is interconnected with the streaming server 50, the control data server 60, and the application server 70 via a network 90 such as the Internet.

The transmission apparatus 10 transmits broadcast content such as a program and a CM, and an application via the broadcast wave of digital broadcasting. In addition, together with components and applications, the transmission apparatus 10 transmits transmission data and control data via the broadcast wave of digital broadcasting. In addition, the broadcast content is constituted by components of videos, audios, and the like. In addition, the transmission data includes a PMT. The control data is an MPD or an AIT.

In addition, the transmission apparatus 10 is equivalent to the above-described transmitter, and is managed by a broadcasting station (broadcasting operator).

The receiving apparatus 20 receives a broadcast signal transmitted from the transmission apparatus 10. The receiving apparatus 20 acquires control data based on transmission data obtained from the broadcast signal. Based on the transmission data and the control data, the receiving apparatus 20 acquires components of videos, audios, and the like, and outputs videos and audios of broadcast content such as a program. In addition, the receiving apparatus 20 acquires an application obtained from the broadcast signal from the transmission apparatus 10, and executes the application in conjunction with the broadcast content such as a program.

In addition, the receiving apparatus 20 is equivalent to the above-described receiver, and is installed in each house or the like. In addition, the receiving apparatus 20 may include a display and a loudspeaker to be formed as an independent apparatus. Alternatively, the receiving apparatus 20 may be built into a television receiver, a video recorder, or the like.

The streaming server 50 accumulates communication content such as a program and a CM. The streaming server 50 streaming-delivers the communication content via the network 90 in response to a request from the receiving apparatus 20. Based on the control data, the receiving apparatus 20 acquires components of videos and audios streaming-delivered from the streaming server 50 via the network 90, and outputs videos and audios of the communication content such as a program.

In addition, the streaming server 50 is equivalent to the above-described streaming server, and is managed by, for example, a broadcasting operator or the like.

The control data server 60 manages control data such as an MPD and an AIT, and delivers the control data via the network 90. Based on transmission data, the receiving apparatus 20 accesses the control data server 60 via the network 90, and acquires control data. Based on the control data from the control data server 60, the receiving apparatus 20 acquires components of videos and audios.

In addition, the control data server 60 is equivalent to the above-described control data server, and is managed by, for example, a broadcasting operator or the like.

The application server 70 manages an application executed in conjunction with broadcast content or communication content, and delivers the application via the network 90. Based on the control data, the receiving apparatus 20 accesses the application server 70 via the network 90, and acquires an application. The receiving apparatus 20 executes the application from the application server 70 in conjunction with broadcast content or communication content.

In addition, the application server 70 is equivalent to the above-described application server, and is provided by, for example, a broadcasting operator, an application production operator, or the like.

The broadcast communication cooperation system 1 has the above-described configuration. Next, the detailed configurations of the apparatuses included in the broadcast communication cooperation system 1 illustrated in FIG. 10 will be described with reference to FIGS. 11 to 13.

(Configuration Example of Transmission Apparatus)

Figure 11:
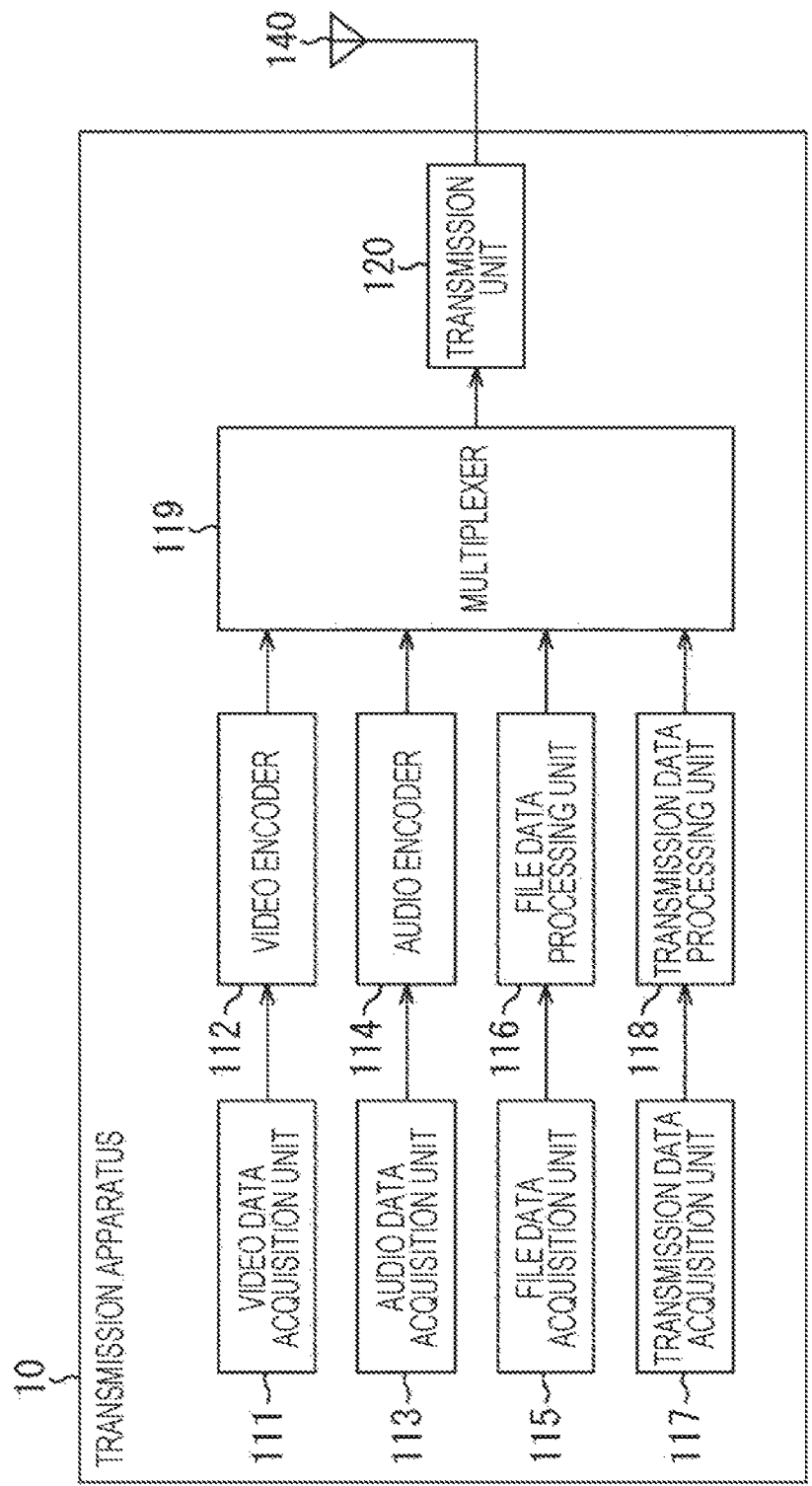
FIG. 11 is a diagram illustrating a configuration of an embodiment of a transmission apparatus to which the present technology is applied.

FIG. 11 is a diagram illustrating a configuration of an embodiment of a transmission apparatus to which the present technology is applied.

As illustrated in FIG. 11, the transmission apparatus 10 includes a video data acquisition unit 111, a video encoder 112, an audio data acquisition unit 113, an audio encoder 114, a file data acquisition unit 115, a file data processing unit 116, a transmission data acquisition unit 117, a transmission data processing unit 118, a multiplexer 119, and a transmission unit 120.

The video data acquisition unit 111 acquires video data serving as components, from an internal storage, an external server, a camera, or the like, and supplies the acquired video data to the video encoder 112. The video encoder 112 encodes the video data supplied from the video data acquisition unit 111, in compliance with an encoding method such as an MPEG, and supplies the encoded video data to the multiplexer 119.

The audio data acquisition unit 113 acquires audio data serving as components, from an internal storage, an external server, a microphone, or the like, and supplies the acquired audio data to the audio encoder 114. The audio encoder 114 encodes the audio data supplied from the audio data acquisition unit 113, in compliance with an encoding method such as an MPEG, and supplies the encoded audio data to the multiplexer 119.

When data in a file format such as an MPD, an AIT, and an application is transmitted, the file data acquisition unit 115 acquires file data such as an MPD, an AIT, and an application from an internal storage, an external server, or the like, and supplies the acquired file data to the file data processing unit 116. The file data processing unit 116 performs predetermined data processing on the file data supplied from the file data acquisition unit 115, and supplies the processed file data to the multiplexer 119.

For example, in a case in which an application is created in the HTML5, an HTML file, an image file such as a Joint Photographic Experts Group (JPEG) and Portable Network Graphics (PNG), and the like are acquired, and data processing for transmission by a data carousel is performed for each of objects constituting data that are referred to as modules. In addition, for example, an MPD and an AIT are constituted by XML files, and are similarly subjected to the data processing for transmission by a data carousel.

The transmission data acquisition unit 117 acquires transmission data from an internal storage, an external server, or the like, and supplies the acquired transmission data to the transmission data processing unit 118. The transmission data processing unit 118 performs predetermined data processing on the transmission data supplied from the transmission data acquisition unit 117, and supplies the processed transmission data to the multiplexer 119. The transmission data includes a PMT and the like.

The multiplexer 119 multiplexes the video data from the video encoder 112, the audio data from the audio encoder 114, and the transmission data from the transmission data processing unit 118, and generates a transport stream. In addition, in a case in which file data is supplied from the file data processing unit 116, the multiplexer 119 further multiplexes the file data. The transport stream generated by the multiplexer 119 is supplied to the transmission unit 120.

The transmission unit 120 transmits the transport stream supplied from the multiplexer 119, via an antenna 140, as a broadcast signal (broadcast wave) that is compliant with the MPEG2-TS standard.

(Configuration Example of Receiving Apparatus)

Figure 12:
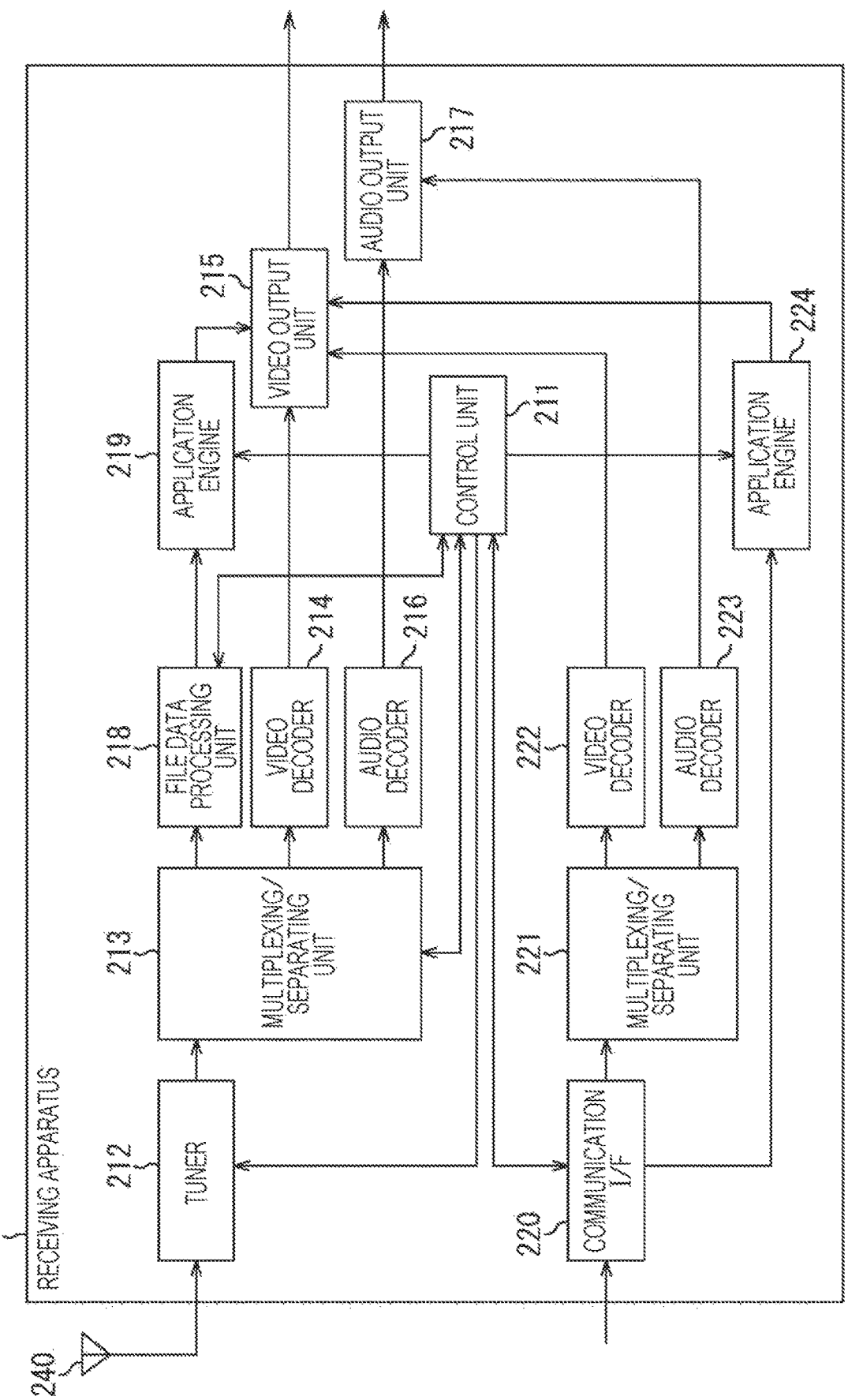
FIG. 12 is a diagram illustrating a configuration of an embodiment of a receiving apparatus to which the present technology is applied.

FIG. 12 is a diagram illustrating a configuration of an embodiment of a receiving apparatus to which the present technology is applied.

As illustrated in FIG. 12, the receiving apparatus 20 includes a control unit 211, a tuner 212, a multiplexing/separating unit 213, a video decoder 214, a video output unit 215, an audio decoder 216, an audio output unit 217, a file data processing unit 218, an application engine 219, a communication I/F 220, a multiplexing/separating unit 221, a video decoder 222, an audio decoder 223, and an application engine 224.

The control unit 211 controls the functions of the units in the receiving apparatus 20.

According to the control from the control unit 211, the tuner 212 extracts a broadcast signal of a service (channel) selected according to an instruction, from broadcast signals received from an antenna 240, and demodulates the extracted broadcast signal. The tuner 212 then supplies a resultant transport stream to the multiplexing/separating unit 213.

According to the control from the control unit 211, the multiplexing/separating unit 213 separates the transport stream supplied from the tuner 212, into video data, audio data, file data, and transmission data. The multiplexing/separating unit 213 supplies the video data, the audio data, the file data, and the transmission data to the video decoder 214, the audio decoder 216, the file data processing unit 218, and the control unit 211, respectively.

According to the control from the control unit 211, the video decoder 214 decodes the video data supplied from the multiplexing/separating unit 213, by a decoding method corresponding to, for example, the video encoder 112 (FIG. 11), and supplies the decoded video data to the video output unit 215. According to the control from the control unit 211, the video output unit 215 outputs the video data supplied from the video decoder 214, to a display (not illustrated) on a subsequent stage. As a result, for example, a video of a program or the like is displayed on the display.

According to the control from the control unit 211, the audio decoder 216 decodes the audio data supplied from the multiplexing/separating unit 213, by a decoding method corresponding to, for example, the audio encoder 114 (FIG. 11), and supplies the decoded audio data to the audio output unit 217. According to the control from the control unit 211, the audio output unit 217 outputs the audio data supplied from the audio decoder 216, to a loudspeaker (not illustrated) on a subsequent stage. As a result, for example, audio synchronized with the video of the program is output from the loudspeaker.

According to the control from the control unit 211, the file data processing unit 218 performs predetermined data processing on the file data supplied from the multiplexing/separating unit 213.

For example, by performing predetermined data processing on file data transmitted by a data carousel, for each of objects constituting the data that are referred to as modules, the file data processing unit 218 acquires HTML files and the like that constitute an application, and supplies the acquired HTML files to the application engine 219. In addition, by performing predetermined data processing on file data transmitted by a data carousel, the file data processing unit 218 acquires control data (MPD or AIT), and supplies the acquired control data to the control unit 211.

According to the control from the control unit 211, the application engine 219 executes an HTML browser, and supplies video data corresponding to the application constituted by the file data supplied from the file data processing unit 218, to the video output unit 215. According to the control from the control unit 211, the video output unit 215 outputs the video data supplied from the application engine 219, to a display (not illustrated) on a subsequent stage. As a result, for example, information of the application such as closed caption and weather forecast is displayed on the display in conjunction with the video of the program.

Based on transmission data (e.g., PMT) supplied from the multiplexing/separating unit 213, the control unit 211 controls the function of each unit. In addition, based on control data (MPD or AIT) supplied from the file data processing unit 218, the control unit 211 controls the function of each unit.

According to the control from the control unit 211, the communication I/F 220 accesses the streaming server 50 via the network 90 to receive streaming-delivered streaming data such as a program, and the supplies the received streaming data to the multiplexing/separating unit 221.

According to the control from the control unit 211, the multiplexing/separating unit 221 separates the streaming data supplied from the communication I/F 220, into video data and audio data, and supplies the video data and the audio data to the video decoder 222 and the audio decoder 223, respectively.

According to the control from the control unit 211, the video decoder 222 decodes the video data supplied from the multiplexing/separating unit 221, by a predetermined decoding method, and supplies the decoded video data to the video output unit 215. According to the control from the control unit 211, the video output unit 215 outputs the video data supplied from the video decoder 222, to a display (not illustrated) on a subsequent stage. As a result, for example, a video of a program or the like is displayed on the display.

According to the control from the control unit 211, the audio decoder 223 decodes the audio data supplied from the multiplexing/separating unit 221, by a predetermined decoding method, and supplies the decoded audio data to the audio output unit 217. According to the control from the control unit 211, the audio output unit 217 outputs the audio data supplied from the audio decoder 223, to a loudspeaker (not illustrated) on a subsequent stage. As a result, for example, audio synchronized with the video of the program is output from the loudspeaker.

In addition, according to the control from the control unit 211, the communication I/F 220 accesses the control data server 60 via the network 90 to receive control data (MPD or AIT), and the supplies the received control data to the control unit 211. Based on the control data (MPD or AIT) supplied from the communication I/F 220, the control unit 211 controls the function of each unit.

Furthermore, according to the control from the control unit 211, the communication I/F 220 accesses the application server 70 via the network 90 to receive file data constituting the application, and the supplies the received file data to the application engine 224.

According to the control from the control unit 211, the application engine 224 executes an HTML browser, and supplies video data corresponding to the application constituted by the file data supplied from the communication I/F 220, to the video output unit 215. According to the control from the control unit 211, the video output unit 215 outputs the video data supplied from the application engine 224, to a display (not illustrated) on a subsequent stage. As a result, for example, information of the application such as closed caption and weather forecast is displayed on the display in conjunction with the video of the program.

(Functional Configuration Example of Control Unit)

Figure 13:
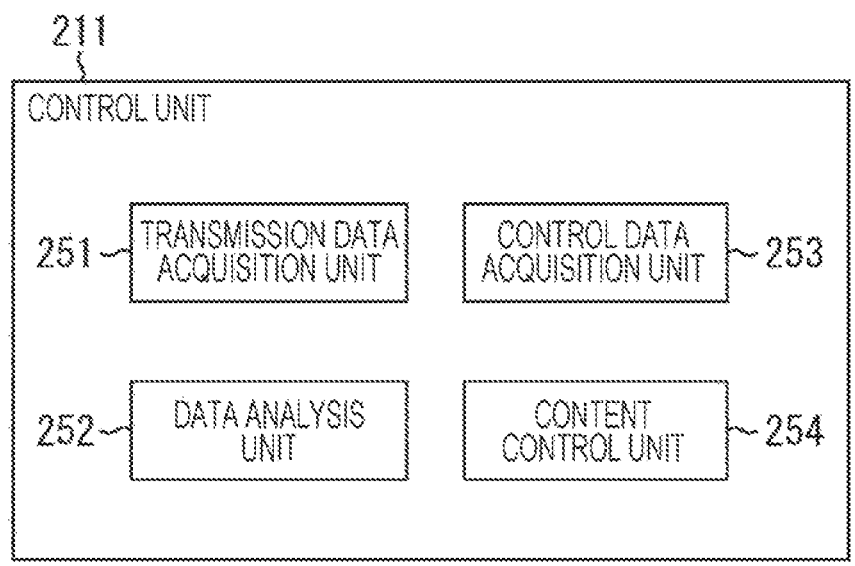
FIG. 13 is a diagram illustrating a functional configuration example of a control unit.

FIG. 13 is a diagram illustrating a functional configuration example of the control unit in FIG. 12.

The control unit 211 includes a transmission data acquisition unit 251, a data analysis unit 252, a control data acquisition unit 253, and a content control unit 254.

The transmission data acquisition unit 251 controls the tuner 212 and the multiplexing/separating unit 213 to acquire transmission data included in the transport stream, and supplies the acquired transmission data to the data analysis unit 252.

The data analysis unit 252 analyzes the transmission data supplied from the transmission data acquisition unit 251, and supplies the obtained analysis result to the control data acquisition unit 253.

According to the analysis result obtained by the data analysis unit 252, the control data acquisition unit 253 controls the file data processing unit 218 to acquire control data transmitted via the broadcast wave, and supplies the acquired control data to the data analysis unit 252. In addition, according to the analysis result obtained by the data analysis unit 252, the control data acquisition unit 253 controls the communication I/F 220 to acquire control data delivered from the control data server 60, and supplies the acquired control data to the data analysis unit 252.

The data analysis unit 252 analyzes the control data supplied from the control data acquisition unit 253, and supplies the obtained analysis result to the content control unit 254.

According to the analysis result obtained by the data analysis unit 252, the content control unit 254 controls the tuner 212, the multiplexing/separating unit 213, and the like, to acquire components constituting broadcast content transmitted via the broadcast wave, in such a manner as to output the video and the audio thereof. In addition, according to the analysis result obtained by the data analysis unit 252, the content control unit 254 controls the communication I/F 220, the multiplexing/separating unit 221, and the like, to acquire components streaming-delivered from the streaming server 50 via the network 90, in such a manner as to output the video and the audio thereof.

In addition, according to the analysis result obtained by the data analysis unit 252, the content control unit 254 controls the file data processing unit 218, the application engine 219, and the like in such a manner as to present an application transmitted via the broadcast wave. In addition, according to the analysis result obtained by the data analysis unit 252, the content control unit 254 controls the communication I/F 220, the application engine 224, and the like in such a manner as to present an application delivered from the application server 70.

<5. Flow of Specific Processing Executed in Each Apparatus>

Next, flows of specific processing executed in the respective apparatuses included in the broadcast communication cooperation system 1 illustrated in FIG. 10 will be described with reference to FIGS. 14 to 17.

(Transmission Processing)

Figure 14:
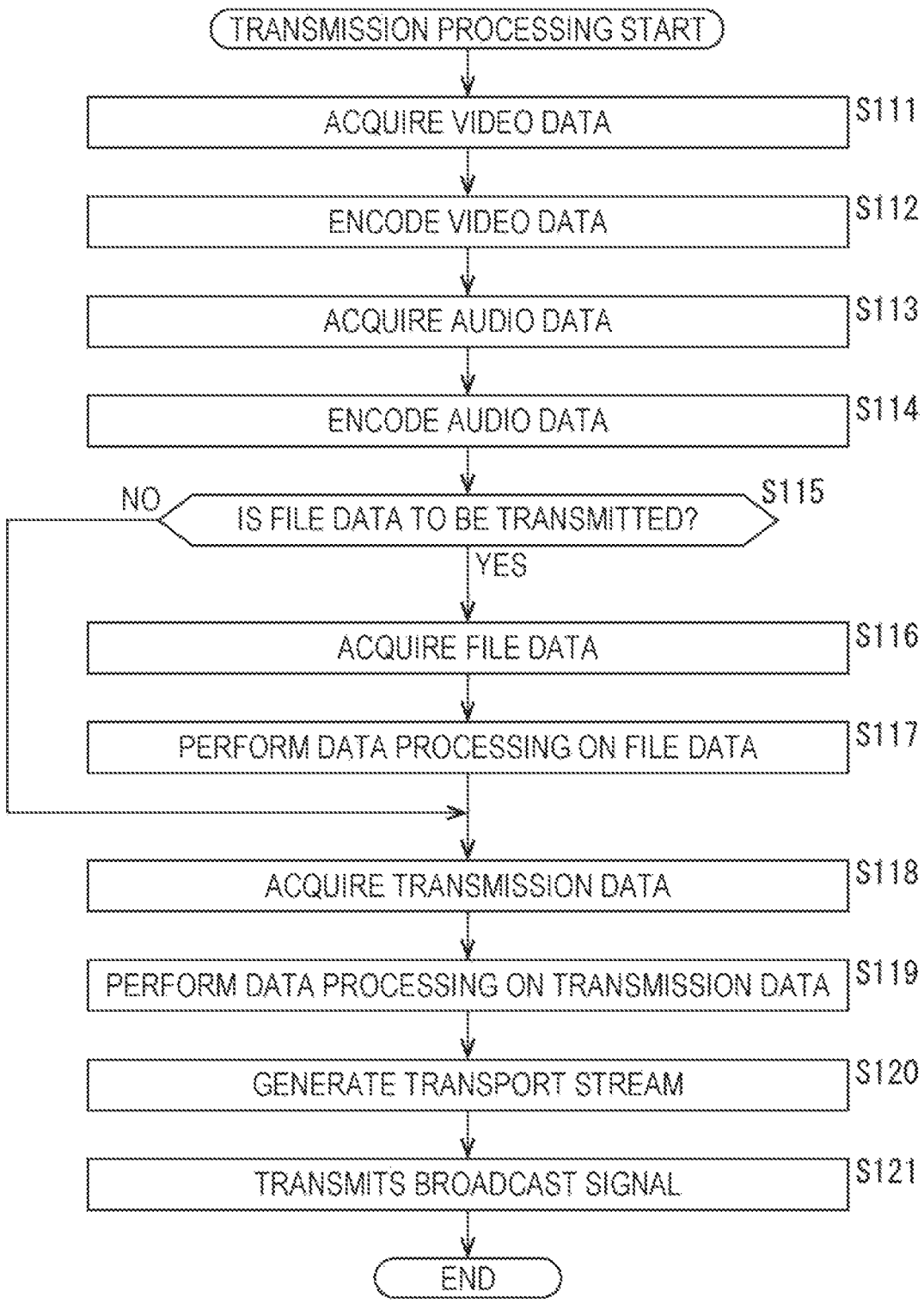
FIG. 14 is a flowchart illustrating transmission processing.

First, transmission processing executed by the transmission apparatus 10 illustrated in FIG. 10 will be described with reference to a flowchart illustrated in FIG. 14.

In step S111, the video data acquisition unit 111 acquires video data serving as components, and supplies the acquired video data to the video encoder 112. In step S112, the video encoder 112 encodes the video data supplied from the video data acquisition unit 111, and supplies the encoded video data to the multiplexer 119.

In step S113, the audio data acquisition unit 113 acquires audio data serving as components, and supplies the acquired audio data to the audio encoder 114. In step S114, the audio encoder 114 encodes the audio data supplied from the audio data acquisition unit 113, and supplies the encoded audio data to the multiplexer 119.

In step S115, it is determined whether file data such as an MPD, an AIT, and an application is to be transmitted. If it is determined in step S115 that file data is to be transmitted, the processing proceeds to step S116.

In step S116, the file data acquisition unit 115 acquires file data such as an MPD, an AIT, and an application, and supplies the acquired file data to the file data processing unit 116. In step S117, the file data processing unit 116 performs data processing for transmission by a data carousel, on the file data supplied from the file data acquisition unit 115, and supplies the resultant data to the multiplexer 119.

In addition, if it is determined in step S115 that file data is not to be transmitted, the processing in steps S116 to S117 is skipped, and the processing proceeds to step S118. In this case, for example, control data such as an MPD and an AIT is delivered from the control data server 60, and an application is delivered from the application server 70.

In step S118, the transmission data acquisition unit 117 acquires transmission data, and supplies the acquired transmission data to the transmission data processing unit 118. In step S119, the transmission data processing unit 118 performs predetermined data processing on the transmission data supplied from the transmission data acquisition unit 117, and supplies the processed transmission data to the multiplexer 119.

In step S120, the multiplexer 119 multiplexes the video data from the video encoder 112, the audio data from the audio encoder 114, and the transmission data from the transmission data processing unit 118, generates a transport stream, and supplies the generated transport stream to the transmission unit 120. In addition, in a case in which it is determined in the determination processing in step S115 that file data is to be transmitted, and in a case in which file data is supplied from the file data processing unit 116, the multiplexer 119 further multiplexes the file data.

In step S121, the transmission unit 120 transmits the transport stream supplied from the multiplexer 119, via the antenna 140, as a broadcast signal (broadcast wave). When the processing in step S121 is ended, the transmission processing is ended.

The transmission processing has been described above.

(Channel Selection Processing)

Figure 15:
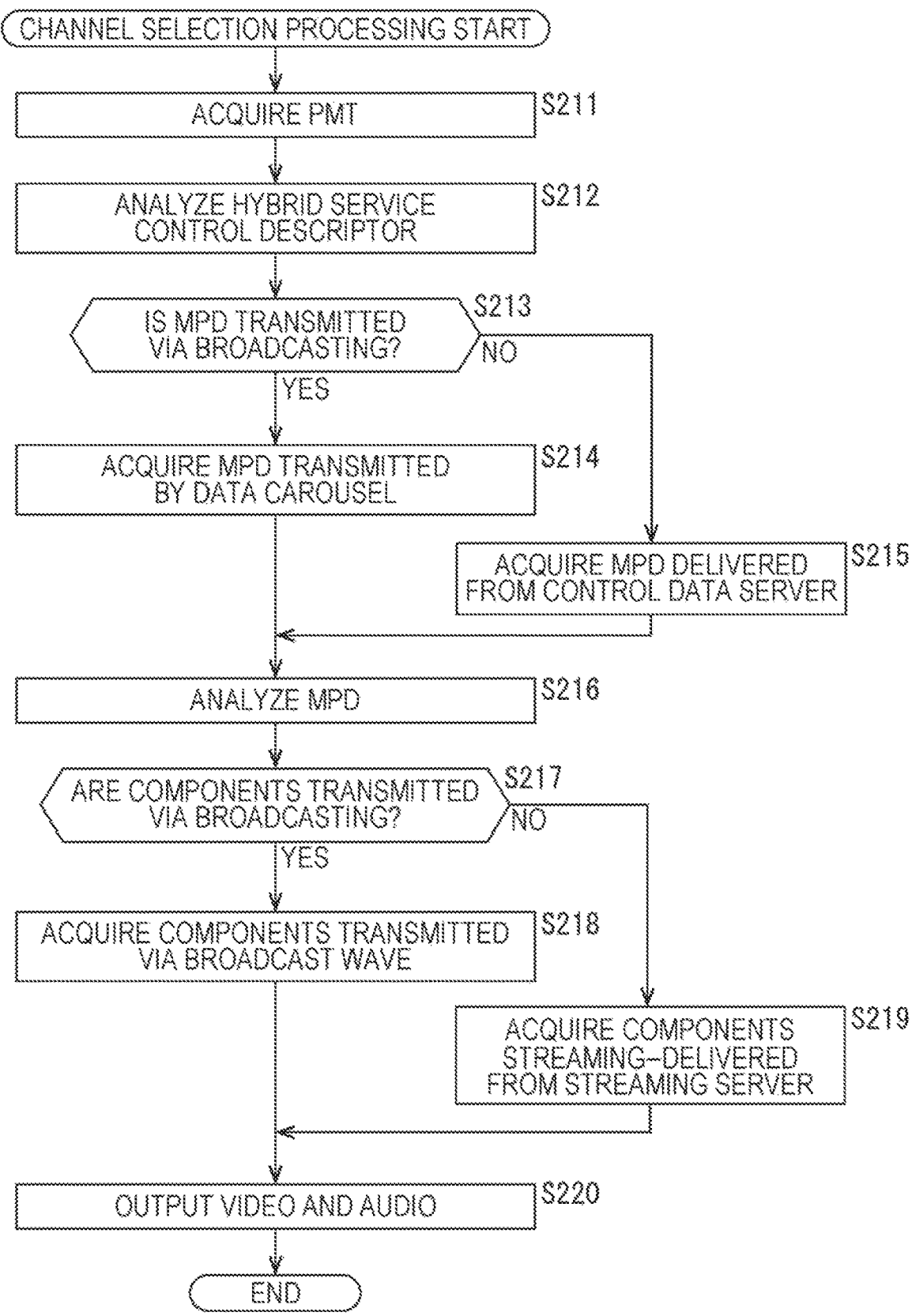
FIG. 15 is a flowchart illustrating channel selection processing.

Next, channel selection processing executed by the receiving apparatus 20 illustrated in FIG. 10 will be described with reference to a flowchart illustrated in FIG. 15. For example, the channel selection processing is executed when a predetermined service (channel) is selected by the user manipulating a remote controller.

In step S211, the transmission data acquisition unit 251 acquires a PMT as transmission data separated by the multiplexing/separating unit 213, and supplies the acquired PMT to the data analysis unit 252.

In step S212, the data analysis unit 252 analyzes a hybrid service control descriptor disposed in the PMT supplied from the transmission data acquisition unit 251. In step S213, the data analysis unit 252 determines, based on the analysis result obtained through the processing in step S212, whether an MPD is transmitted via broadcasting.

If it is determined in step S213 that an MPD is transmitted via broadcasting, the processing proceeds to step S214. In step S214, the control data acquisition unit 253 controls the file data processing unit 218 to acquire an MPD transmitted by a data carousel, and supplies the acquired MPD to the data analysis unit 252.

On the other hand, if it is determined in step S213 that an MPD is not transmitted via broadcasting, i.e., an MPD is transmitted via communication, the processing proceeds to step S215. In step S215, the control data acquisition unit 253 controls the communication I/F 220 to acquire an MPD delivered from the control data server 60 via the network 90, and supplies the acquired MPD to the data analysis unit 252.

If an MPD transmitted via broadcasting or communication is acquired through the processing in step S214 or S215, the processing proceeds to step S216. In step S216, the data analysis unit 252 analyzes the MPD supplied from the control data acquisition unit 253. In step S217, the data analysis unit 252 determines, based on the analysis result obtained through the processing in step S216, whether components are transmitted via broadcasting.

If it is determined in step S217 that components are transmitted via broadcasting, the processing proceeds to step S218. In step S218, the content control unit 254 controls the tuner 212, the multiplexing/separating unit 213, and the like, to acquire components transmitted via the broadcast wave. Among the components acquired in this manner, video data is supplied to the video decoder 214, and audio data is supplied to the audio decoder 216. Then, after being decoded by the video decoder 214 and the audio decoder 216, the video data and the audio data are supplied to the video output unit 215 and the audio output unit 217, respectively.

On the other hand, if it is determined in step S217 that components are not transmitted via broadcasting, i.e., components are transmitted via communication, the processing proceeds to step S219. In step S219, the content control unit 254 controls the communication I/F 220, the multiplexing/separating unit 221, and the like, to acquire components streaming-delivered from the streaming server 50 via the network 90. Among the components acquired in this manner, video data is supplied to the video decoder 222, and audio data is supplied to the audio decoder 223. Then, after being decoded by the video decoder 222 and the audio decoder 223, the video data and the audio data are supplied to the video output unit 215 and the audio output unit 217, respectively.

If components transmitted via broadcasting or communication are acquired through the processing in step S218 or S219, the processing proceeds to step S220. In addition, in this example, the description has been given of a case in which components are acquired via either broadcasting or communication. Nevertheless, both broadcasting and communication can be used. For example, video data transmitted via broadcasting is acquired, and audio data transmitted via communication is acquired.

In step S220, the video output unit 215 outputs the video data supplied from the video decoder 214 or the video decoder 222, to a display on a subsequent stage. In addition, the audio output unit 217 outputs the audio data supplied from the audio decoder 216 or the audio decoder 223, to a loudspeaker on a subsequent stage. As a result, for example, the video and the audio of a program is output from the display and the loudspeaker. When the processing in step S220 is ended, the channel selection processing is ended.

The channel selection processing has been described above.

(Application Presentation Processing)

Figure 16:
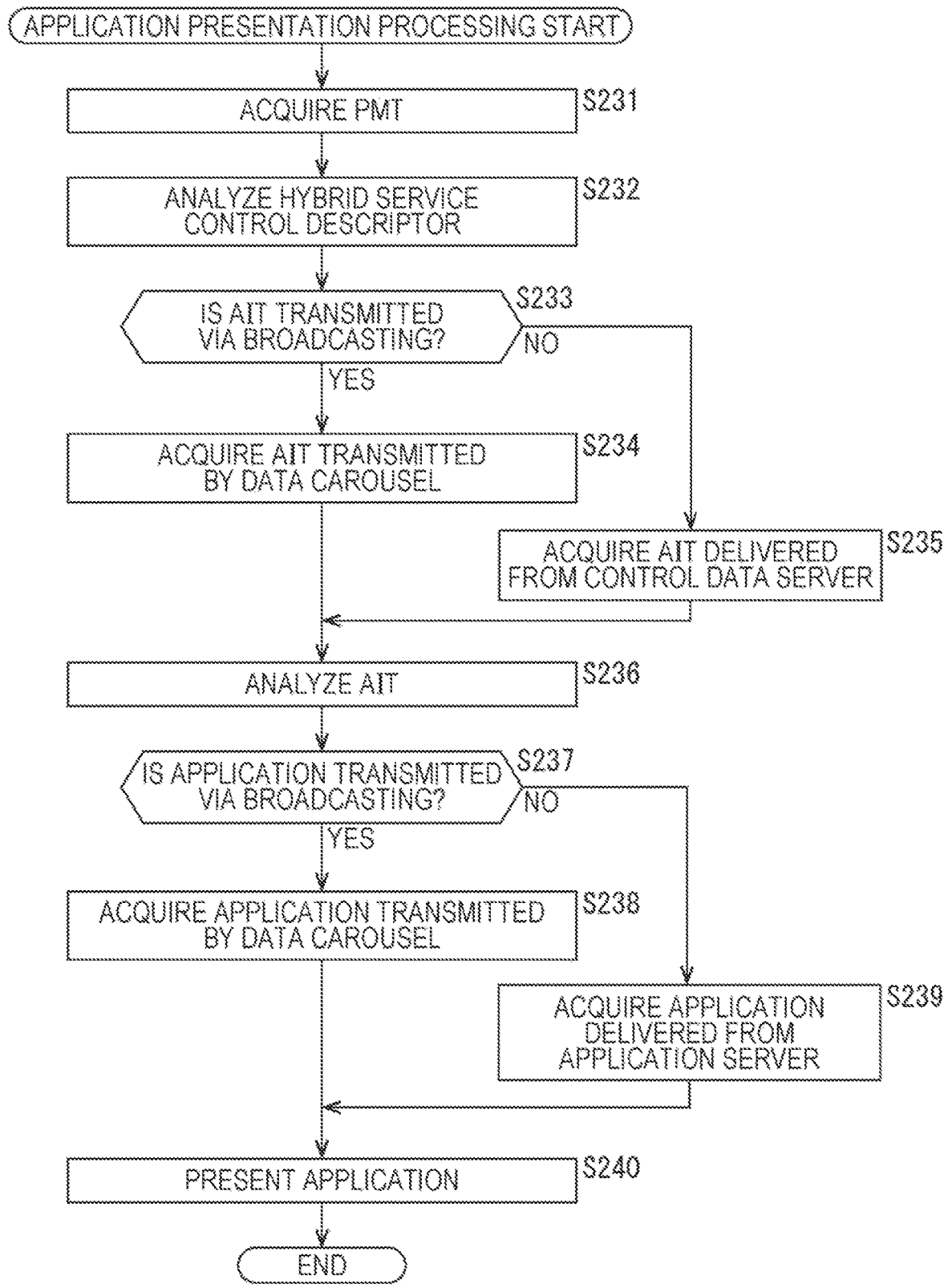
FIG. 16 is a flowchart illustrating application presentation processing.

Next, application presentation processing executed by the receiving apparatus 20 illustrated in FIG. 10 will be described with reference to a flowchart illustrated in FIG. 16.

In step S231, the transmission data acquisition unit 251 acquires a PMT as transmission data separated by the multiplexing/separating unit 213, and supplies the acquired PMT to the data analysis unit 252.

In step S232, the data analysis unit 252 analyzes a hybrid service control descriptor disposed in the PMT supplied from the transmission data acquisition unit 251. In step S233, the data analysis unit 252 determines, based on the analysis result obtained through the processing in step S232, whether an AIT is transmitted via broadcasting.

If it is determined in step S233 that an AIT is transmitted via broadcasting, the processing proceeds to step S234. In step S234, the control data acquisition unit 253 controls the file data processing unit 218 to acquire an AIT transmitted by a data carousel, and supplies the acquired MPD to the data analysis unit 252.

On the other hand, if it is determined in step S233 that an AIT is not transmitted via broadcasting, i.e., an AIT is transmitted via communication, the processing proceeds to step S235. In step S235, the control data acquisition unit 253 controls the communication I/F 220 to acquire an AIT delivered from the control data server 60 via the network 90, and supplies the acquired AIT to the data analysis unit 252.

If an AIT transmitted via broadcasting or communication is acquired through the processing in step S234 or S235, the processing proceeds to step S236. In step S236, the data analysis unit 252 analyzes the AIT supplied from the control data acquisition unit 253. In step S237, the data analysis unit 252 determines, based on the analysis result obtained through the processing in step S236, whether an application is transmitted via broadcasting.

If it is determined in step S237 that an application is transmitted via broadcasting, the processing proceeds to step S238. In step S238, the content control unit 254 controls the file data processing unit 218 to acquire file data constituting an application transmitted by a data carousel. The file data acquired in this manner is supplied to the application engine 219, and after predetermined processing is executed by the HTML browser, the file data is supplied to the video output unit 215.

On the other hand, if it is determined in step S237 that an application is not transmitted via broadcasting, i.e., an application is transmitted via communication, the processing proceeds to step S239. In step S239, the content control unit 254 controls the communication I/F 220 to acquire file data constituting an application delivered from the application server 70 via the network 90. The file data acquired in this manner is supplied to the application engine 224, and after predetermined processing is executed by the HTML browser, the file data is supplied to the video output unit 215.

If an application transmitted via broadcasting or communication is acquired through the processing in step S238 or S239, the processing proceeds to step S240.

In step S240, the video output unit 215 outputs video data supplied from the application engine 219 or the application engine 224, to a display on a subsequent stage, and presents the application. As a result, for example, information of the application such as closed caption and weather forecast is displayed on the display in conjunction with the video of the program. When the processing in step S240 is ended, the application presentation processing is ended.

The application presentation processing has been described above.

(Broadcasting Transmission Component URL Resolution Processing)

Figure 17:
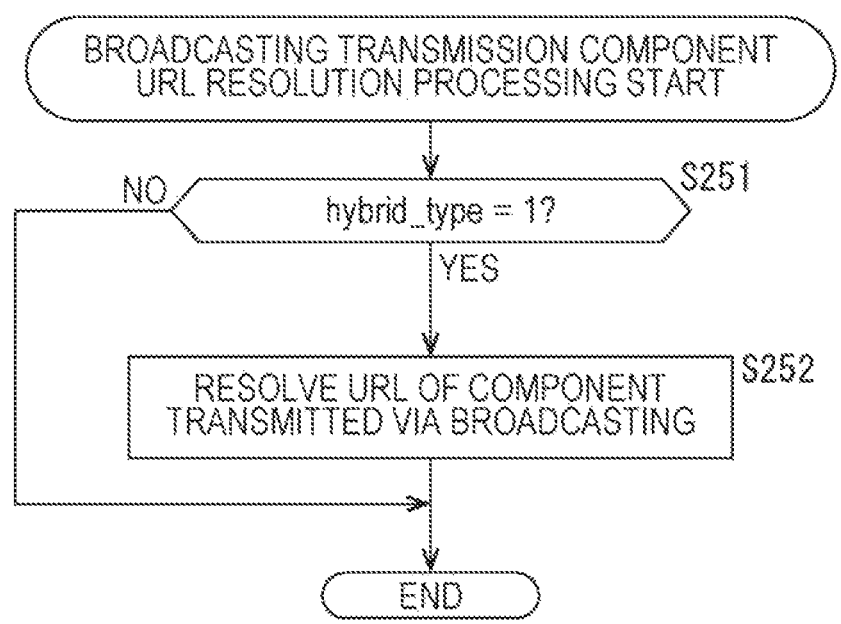
FIG. 17 is a flowchart illustrating broadcasting transmission component URL resolution processing.

Lastly, broadcasting transmission component URL resolution processing executed by the receiving apparatus 20 illustrated in FIG. 10 will be described with reference to a flowchart illustrated in FIG. 17. In addition, for example, the broadcasting transmission component URL resolution processing is executed as partial processing of the MPD analysis processing in step S216 in FIG. 15.

In step S251, the data analysis unit 252 determines whether is designated as a hybrid type of a hybrid service control descriptor.

If it is determined in step S251 that "1" is designated as a hybrid_type, the processing proceeds to step S252. In step S252, the data analysis unit 252 resolves a URL of a component in an MPD that is transmitted via broadcasting.

More specifically, in a case in which "1" is designated as a hybrid_type, a control range of an MPD is broadcasting and communication. Thus, for example, as illustrated in FIG. 8, a component transmitted via broadcasting is identified according to a URL rule (e.g., whether a BaseURL of an MPD include a character "B"). In addition, in this step, a URL may be resolved using an MPD_Broadcast_Base_URI and a component tag as illustrated in FIG. 9.

On the other hand, if it is determined in step S251 that "1" is not designated as a hybrid_type, i.e., "2" is designated as a hybrid_type, the processing in step S252 is skipped.

More specifically, in a case in which "2" is designated as a hybrid_type, a control range of an MPD is communication only. Thus, for example, as illustrated in FIG. 7, only information about adaptive streaming delivery using communication is designated in the MPD. It is therefore not necessary to resolve a URL of a component transmitted via broadcasting.

When the processing in step S252 is ended, or if it is determined to be "NO" in step S251, the broadcasting transmission component URL resolution processing is ended.

The broadcasting transmission component URL resolution processing has been described above.

<6. Configuration of Computer>

The above-described series of processes can be executed by hardware, and can be executed by software. When the series of processes are executed by software, programs constituting the software are installed on a computer. Here, the computer includes a computer built in dedicated hardware and a general-purpose personal computer that can execute various types of functions by installing various types of programs, for example.

Figure 18:
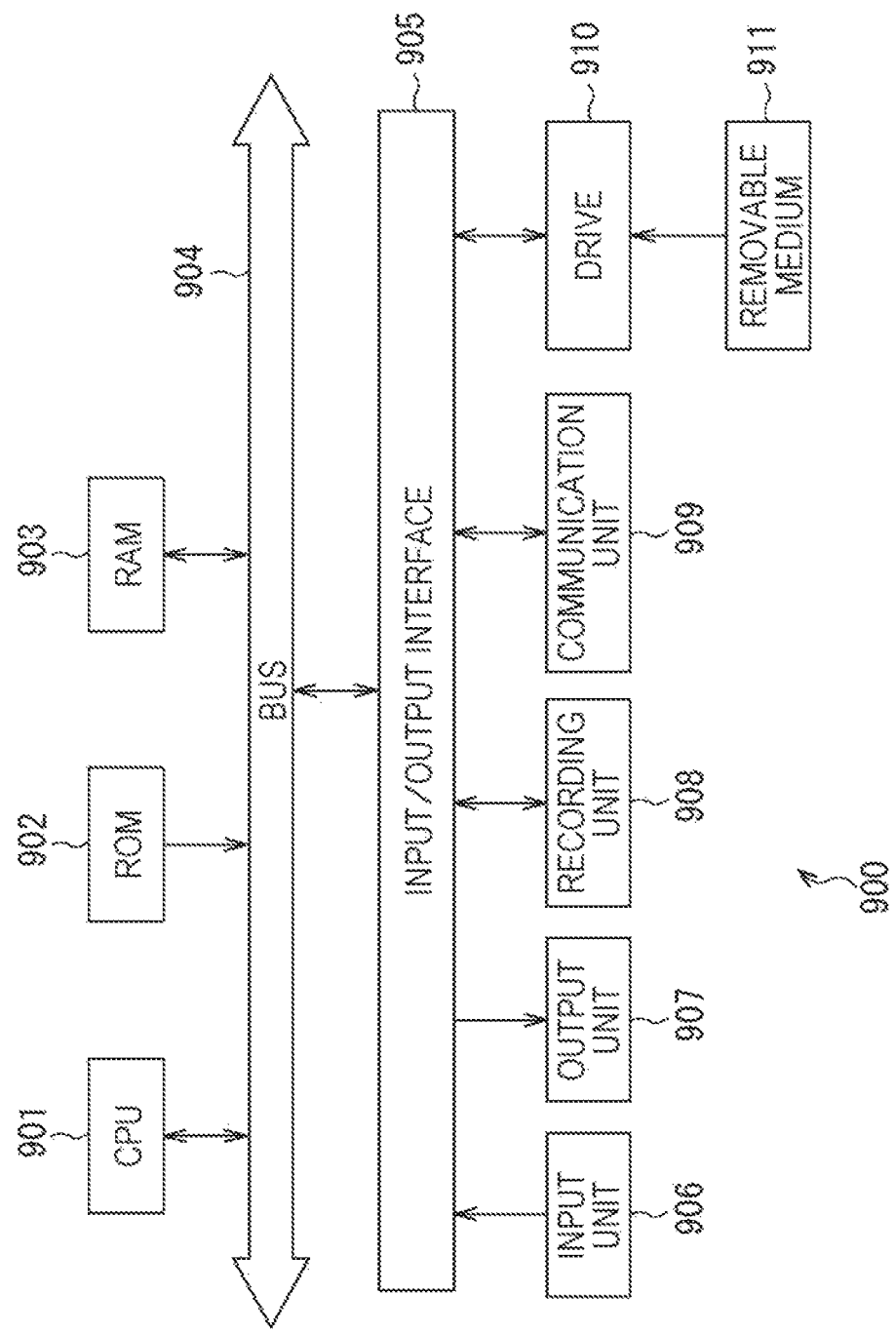
FIG. 18 is a diagram illustrating a configuration example of a computer.

FIG. 18 is a diagram illustrating a hardware configuration example of a computer that executes the above-described series of processes according to programs.

In a computer 900, a Central Processing Unit (CPU) 901, a Read Only Memory (ROM) 902, and a Random Access Memory (RAM) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 includes a keyboard, a mouse, a microphone, and the like. The output unit 907 includes a display, a loudspeaker, and the like. The recording unit 908 includes a hard disc, a nonvolatile memory, and the like. The communication unit 909 includes a network interface and the like. The drive 910 drives a removable medium 911 such as a magnetic disc, an optical disk, a magneto-optical disk, a semiconductor memory, or the like.

In the computer 900 having the above-described configuration, the above-described series of processes are performed by the CPU 901 loading programs stored in, for example, the recording unit 908, into the RAM 903 via the input/output interface 905 and the bus 904, and executing the programs.

The programs executed by the computer 900 (the CPU 901) can be provided with being recorded on, for example, the removable medium 911 serving as a package medium or the like. In addition, the programs can be provided via a wired or wireless transmission medium such as a local area network, the Internet, and digital satellite broadcasting.

In the computer 900, the programs can be installed on the recording unit 908 via the input/output interface 905 by attaching the removable medium 911 to the drive 910. Alternatively, via a wired or wireless transmission medium, the programs can be received by the communication unit 909 and installed on the recording unit 908. Yet alternatively, the program can be preinstalled on the ROM 902 and the recording unit 908.

In addition, programs executed by the computer 900 may be programs according to which processes are chronologically performed in the order described in this specification. Alternatively, the programs may be programs according to which processes are performed in parallel, or at necessary timings such as a timing when call-out is performed.

Here, in this specification, processing steps in which programs for causing the computer 900 to perform various types of processes are described do not necessarily have to be chronologically processed in the orders described as flowcharts, and include processes executed in parallel or individually (e.g., parallel processing or processing performed by an object).

In addition, the programs may be programs processed by a single computer, or may be programs processed by a plurality of computers in a distributed manner. Furthermore, the programs may be programs transferred to a distant computer to be executed.

Furthermore, in this specification, a system means a set of a plurality of constituent elements (apparatuses, modules (parts), and the like), and it does not matter whether or not all the constituent elements are provided in the same casing. Thus, a plurality of apparatuses stored in separate casings and connected via a network, and a single apparatus in which a plurality of modules is stored in a single casing are both regarded as systems.

In addition, an embodiment of the present technology is not limited to the above-described embodiment, and various changes can be made without departing from the scope of the present technology. For example, the present technology can employ a configuration of cloud computing in which a single function is shared by a plurality of apparatuses and processed in cooperation with each other, via a network.

In addition, instead of being executed in a single apparatus, each step described in the above-described flowcharts can be executed by a plurality of apparatuses in a shared manner. Furthermore, when a plurality of processes is included in a single step, the plurality of processes included in the single step can be executed by a plurality of apparatuses in a shared manner, instead of being executed in a single apparatus.

In addition, the present technology can employ the following configurations.

(1) A receiving apparatus comprising:
  a receiving unit configured to receive a broadcast wave of digital broadcasting;
  an acquisition unit configured to acquire control data transmitted via broadcasting or communication, based on a descriptor, which is disposed in transmission data included in a stream transmitted via the broadcast wave, and in which information about hybrid delivery using broadcasting and communication is described; and
  a control unit configured to control a function of each unit for performing processing of acquiring content transmitted via broadcasting or communication, based on the acquired control data.

(2) The receiving apparatus according to (1),
  wherein the descriptor includes at least type information and location information of the control data.

(3) The receiving apparatus according to (1) or (2),
  wherein the content is constituted by components of a video and an audio, and the control data is control information of the components that includes at least location information pieces of the components.

(4) The receiving apparatus according to (3), wherein the control data includes location information pieces of components transmitted via broadcasting and communication.

(5) The receiving apparatus according to (3), wherein the control data includes location information of a component transmitted only via communication.

(6) The receiving apparatus according to (1) or (2), wherein the content is an application, and the control data is control information of the application.

(7) The receiving apparatus according to any one of (1) to (6), wherein the broadcast wave of digital broadcasting is compliant with an MPEG2-Transport Stream (TS) standard, the transmission data is a Program Map Table (PMT), and the control data is a Media Presentation Description (MPD) or an Application Information Table (AIT).

(8) A receiving method of a receiving apparatus, the receiving method comprising following steps executed by the receiving apparatus:
receiving a broadcast wave of digital broadcasting;
acquiring control data transmitted via broadcasting or communication, based on a descriptor, which is disposed in transmission data included in a stream transmitted via the broadcast wave, and in which information about hybrid delivery using broadcasting and communication is described; and
controlling a function of each unit for performing processing of acquiring content transmitted via broadcasting or communication, based on the acquired control data.

(9) A transmission apparatus comprising:
a first acquisition unit configured to acquire content;
a second acquisition unit configured to acquire, as information about hybrid delivery using broadcasting and communication, transmission data in which a descriptor is disposed, information for acquiring control data transmitted via broadcasting or communication being described in the descriptor; and
a transmission unit configured to transmit a stream including the content and the transmission data, via a broadcast wave of digital broadcasting.

(10) A transmission method of a transmission apparatus, the transmission method comprising following steps executed by the transmission apparatus:
acquiring content;
acquiring, as information about hybrid delivery using broadcasting and communication, transmission data in which a descriptor is disposed, information for acquiring control data transmitted via broadcasting or communication being described in the descriptor; and
transmitting a stream including the content and the transmission data, via a broadcast wave of digital broadcasting.

(11) A receiving apparatus comprising:
a receiving unit configured to receive a broadcast wave of digital broadcasting;
an acquisition unit configured to acquire control data transmitted via broadcasting or communication, based on transmission data included in a stream transmitted via the broadcast wave; and
a control unit configured to control, based on location information pieces of components of a video and an audio constituting content that are included in the acquired control data, a function of each unit for performing processing of acquiring the components transmitted via broadcasting or communication.

(12) The receiving apparatus according to (11), wherein the control data includes location information pieces of components transmitted via broadcasting and communication, and the receiving apparatus further includes an analysis unit configured to resolve a location of a component transmitted via broadcasting.

(13) The receiving apparatus according to (12), wherein, in a case in which location information included in the control data includes predetermined information, the analysis unit identifies a component corresponding to the location information, to be transmitted via broadcasting.

(14) The receiving apparatus according to (12), wherein a descriptor in which information about hybrid delivery using broadcasting and communication is described is disposed in the transmission data, and the analysis unit performs matching between location information included in the descriptor, and location information included in the control data, and identifies a component having matched location information, to be transmitted via broadcasting.

(15) The receiving apparatus according to (14), wherein the descriptor includes at least type information and location information of the control data, and the acquisition unit acquires the control data transmitted via broadcasting or communication, based on the descriptor.

(16) The receiving apparatus according to (11), wherein the control data includes location information of a component transmitted only via communication, and the control unit controls a function of each unit for performing processing of acquiring the component transmitted via communication, based on location information of the component transmitted only via communication.

(17) The receiving apparatus according to any one of (11) to (16), wherein the broadcast wave of digital broadcasting is compliant with an MPEG2-Transport Stream (TS) standard, the transmission data is a Program Map Table (PMT), and the control data is a Media Presentation Description (MPD).

(18) A receiving method of a receiving apparatus, the receiving method comprising following steps executed by the receiving apparatus:
receiving a broadcast wave of digital broadcasting;
acquiring control data transmitted via broadcasting or communication, based on transmission data included in a stream transmitted via the broadcast wave; and
controlling, based on location information pieces of a video and an audio constituting content that are included in the acquired control data, a function of each unit for performing processing of acquiring the components transmitted via broadcasting or communication.

(19) A transmission apparatus comprising:
a first acquisition unit configured to acquire content constituted by components of a video and an audio;
a second acquisition unit configured to acquire transmission data including information for acquiring control data including location information pieces of the components of the video and the audio, the control data being transmitted via broadcasting or communication; and a transmission unit configured to transmit a stream including the content and the transmission data, via a broadcast wave of digital broadcasting.

(20) A transmission method of a transmission apparatus, the transmission method comprising following steps executed by the transmission apparatus:

acquiring content constituted by components of a video and an audio;

acquiring transmission data including information for acquiring control data including location information pieces of the components of the video and the audio, the control data being transmitted via broadcasting or communication; and transmitting a stream including the content and the transmission data, via a broadcast wave of digital broadcasting.

REFERENCE SIGNS LIST 1 broadcast communication cooperation system
10 transmission apparatus
20 receiving apparatus
50 streaming server
60 control data server
70 application server
90 network
111 video data acquisition unit
113 audio data acquisition unit
115 file data acquisition unit
117 transmission data acquisition unit
120 transmission unit
211 control unit
212 tuner
220 communication I/F
251 transmission data acquisition unit
252 data analysis unit
253 control data acquisition unit
254 content control unit
900 computer
901 CPU

The invention claimed is:

1. A receiving apparatus, comprising:
a Central Processing Unit (CPU) configured to:
receive a stream transmitted via a broadcast wave of digital broadcasting, wherein
the broadcast wave is associated with an MPEG2-Transport Stream (TS) standard,
the stream is a multiplexed stream of transmission data, content, and control data,
the transmission data is a Program Map Table (PMT),
the PMT includes a descriptor associated with control data,
the control data is one of a Media Presentation Description (MPD) or an Application Information Table (AIT), and
the descriptor is a hybrid service control descriptor that comprises type information of the control data, the type information indicating whether the control data is one of the AIT or the MPD;
acquire, based on the hybrid service control descriptor, the control data transmitted via one of a broadcasting process or a communication process;
identify, based on the control data, a location of at least one component of the content, wherein the at least one component is transmitted via the broadcasting process;
acquire, based on the location of the at least one component, the content transmitted via one of the broadcasting process or the communication process; and
control an output device to output the content.

2. The receiving apparatus according to claim 1, wherein the hybrid service control descriptor further comprises location information of the control data.

3. The receiving apparatus according to claim 1, wherein the content comprises video data and audio data,
the control data is control information of the video data and the audio data, and
the control information includes location information of the video data and the audio data.

4. The receiving apparatus according to claim 3, wherein the control data includes the location information of the video data and the audio data transmitted via the broadcasting process and the communication process.

5. The receiving apparatus according to claim 3, wherein the control data includes the location information of one of the video data or the audio data transmitted via the communication process.

6. The receiving apparatus according to claim 1, wherein the content further includes an application, and
the control data is control information of the application.

7. The receiving apparatus according to claim 1, wherein the type information further indicates a transmission route of the control data, and
the transmission route of the control data is one of a broadcast route or a communication route.

8. A method, comprising:
in a receiving apparatus:
receiving a stream transmitted via a broadcast wave of digital broadcasting, wherein
the broadcast wave is associated with an MPEG2-Transport Stream (TS) standard,
the stream is a multiplexed stream of transmission data, content, and control data,
the transmission data is a Program Map Table (PMT),
the PMT includes a descriptor associated with control data,
the control data is one of a Media Presentation Description (MPD) or an Application Information Table (AIT), and
the descriptor is a hybrid service control descriptor that comprises type information of the control data, the type information indicating whether the control data is one of the AIT or the MPD;
acquiring, based on the hybrid service control descriptor, the control data transmitted via one of a broadcasting process or a communication process;
identifying, based on the control data, a location of at least one component of the content, wherein the at least one component is transmitted via the broadcasting process;
acquiring, based on the location of the at least one component, the content transmitted via one of the broadcasting process or the communication process; and
controlling an output device to output the content.

9. A receiving apparatus, comprising:
a Central Processing Unit (CPU) configured to:
receive a stream transmitted via a broadcast wave of digital broadcasting, wherein
the broadcast wave is associated with an MPEG2-Transport Stream (TS) standard,
the stream is a multiplexed stream of transmission data, audio data, video data, and control data,
the transmission data is a Program Map Table (PMT),
the control data is one of a Media Presentation Description (MPD) or an Application Information Table (AIT), and
the transmission data comprises type information of the control data, the type information indicating whether the control data is one of the AIT or the MPD;
acquire, based on the transmission data, the control data transmitted via one of a broadcasting process or a communication process;
identify, based on the control data, a location of at least one component of the audio data and the video data, wherein the at least one component is transmitted via the broadcasting process; and
acquire, based on the location of the at least one component, the audio data and the video data transmitted via one of the broadcasting process or the communication process.

10. The receiving apparatus according to claim 9, wherein the control data includes first location information, and
based on the first location information that includes specific information, the CPU is further configured to identify one of the audio data or the video data corresponding to the first location information transmitted via the broadcasting process.

11. The receiving apparatus according to claim 9, wherein
the transmission data includes a hybrid service control descriptor,
the hybrid service control descriptor corresponds to information associated with hybrid delivery based on the broadcasting process and the communication process, and
the CPU is further configured to:
match second location information in the hybrid service control descriptor and first location information in the control data; and
identify one of the audio data or the video data, that matches the first location information, transmitted via the broadcasting process.

12. The receiving apparatus according to claim 11, wherein
the hybrid service control descriptor comprises the second location information associated with the control data, and
the CPU is further configured to acquire, based on the hybrid service control descriptor, the control data transmitted via one of the broadcasting process or the communication process.

13. The receiving apparatus according to claim 9, wherein
the control data includes location information of the at least one component transmitted via the communication process, and
the CPU is further configured to acquire the audio data and the video data transmitted via the communication process, wherein the audio data and the video data are acquired based on the location information of the audio data and the video data transmitted via the communication process.

14. A method, comprising:
in a receiving apparatus:
receiving a stream transmitted via a broadcast wave of digital broadcasting, wherein
the broadcast wave is associated with an MPEG2-Transport Stream (TS) standard,
the stream is a multiplexed stream of transmission data, audio data, video data, and control data,
the transmission data is a Program Map Table (PMT),
the control data is one of a Media Presentation Description (MPD) or an Application Information Table (AIT), and
the transmission data comprises type information of the control data indicating whether the control data is one of the AIT or the MPD;
acquiring, based on the transmission data, the control data transmitted via one of a broadcasting process or a communication process;
identifying, based on the control data, a location of at least one component of the audio data and the video data, wherein the at least one component is transmitted via the broadcasting process; and
acquiring, based on location of the at least one component, the video data and the audio data transmitted via one of the broadcasting process or the communication process.

* * * * *